US012734954B1

(12) United States Patent
Buchanan et al.

(10) Patent No.: US 12,734,954 B1
(45) Date of Patent: Sep. 15, 2026

(54) CARGO MANAGEMENT SYSTEM

(71) Applicant: Tmat Products, LLC, Wheatland, OK (US)

(72) Inventors: Brock Thomas Buchanan, Oklahoma City, OK (US); Kenneth Austin, Mustang, OK (US); Nicholas Timura, Medina, OH (US); Raymond Timura, Medina, OH (US)

(73) Assignee: Tmat Products, LLC, Wheatland, OK (US)

( * ) Notice: Subject to any disclaimer, the term of this patent is extended or adjusted under 35 U.S.C. 154(b) by 0 days.

(21) Appl. No.: 19/285,751

(22) Filed: Jul. 30, 2025

Related U.S. Application Data

(60) Provisional application No. 63/842,258, filed on Jul. 11, 2025.

(51) Int. Cl.

| | |
|---|---|
| ***B60P 7/135*** | (2006.01) |
| ***B60P 7/08*** | (2006.01) |
| ***B60R 7/08*** | (2006.01) |
| *B60R 13/01* | (2006.01) |

(52) U.S. Cl.
CPC ............. *B60P 7/135* (2013.01); *B60P 7/0892* (2013.01); *B60R 2013/018* (2013.01)

(58) Field of Classification Search
CPC ....... B60P 7/0892; B60P 7/0815; B60P 7/135; B60R 7/02; B60R 2013/018
See application file for complete search history.

(56) References Cited

U.S. PATENT DOCUMENTS

| | | | | |
|---|---|---|---|---|
| 3,027,017 A * | 3/1962 | Luxeder | B60P 7/0892 | 410/121 |
| 4,358,035 A * | 11/1982 | Heidecker | B60R 7/02 | 414/522 |
| 4,902,038 A * | 2/1990 | Grover | B62D 49/0628 | 105/422 |
| 5,131,709 A * | 7/1992 | Spica | B60R 9/00 | 411/258 |
| 2003/0170090 A1* | 9/2003 | Douglas | B60P 1/003 | 410/91 |
| 2008/0169674 A1* | 7/2008 | Giles | B60P 7/0892 | 296/183.1 |

* cited by examiner

*Primary Examiner* — Daniel J Colilla
(74) *Attorney, Agent, or Firm* — Sisson & Banyas, Attorneys at Law, LLC; Jeffrey J. Banyas

(57) ABSTRACT

A cargo management system has at least one cargo mat and at least one cargo manager, which may be a cargo manager assembly. The cargo mat has a top surface, a bottom surface, at least one sidewall, and at least one cavity configured to accept a cargo manager. The mat cavity extends from the top surface toward the bottom surface, and has at least one locking aperture configured to retain a locking fastener. In some instances the cargo manager does not extend past the mat bottom surface when the locking fastener is attached to the mat locking aperture. The cargo mat may have at least one assembly tab and at least one assembly groove, allowing subsequent cargo mats to interact, forming a modular network of cargo mats.

19 Claims, 19 Drawing Sheets

100
200
400/402
311
312
313
314
330
331
332
333
334
340
341
342
343
344
350
352
354
356
360
361
362
363
364
365
366
367
370
372

CARGO MANAGEMENT SYSTEM

CROSS REFERENCES AND PRIORITIES

This application claims priority from U.S. Provisional Application No. 63/842,258 filed on 11 Jul. 2025, the teachings of each of which are incorporated by reference herein in their entirety.

BACKGROUND

Grid-based cargo organization systems are widely used for organizing and securing cargo. Such systems often consist of a base having a network of openings arranged in a grid-like pattern, and a variety of attachments to create compartments, blocking locations, attachment points, and the like. Such cargo organization systems may be used in a variety of settings, e.g., in a garage, and are frequently used with vehicles, such as in pickup truck beds, in van compartments, or on trailer floors.

Existing cargo organization systems often provide for a slidable fit or friction fit between the base and attachment, thus lacking features which facilitate or improve retention or alignment. Existing systems may also be configured to become either permanently attached to a vehicle or trailer, or may simply be difficult to remove once installed.

The need exists, therefore, for an improved system for storing cargo which facilitates retention, alignment, adaptability, and ease of installation and removal.

SUMMARY

Disclosed herein is a cargo management system for attaching a cargo manager to a cargo mat. The cargo mat includes a mat top surface, a mat bottom surface, at least one mat sidewall, at least one mat cavity extending from the mat top surface toward the mat bottom surface, and at least one mat locking aperture. The cargo manager includes at least one locking fastener. The locking fastener is configured to interact with the mat locking aperture to securely attach the cargo manager to the cargo mat.

In preferred embodiments no portion of the cargo manager extends past the mat bottom surface when the locking fastener is attached to the mat locking aperture.

In some embodiments the cargo mat includes a mat first sidewall which has a mat first sidewall first endpoint and a mat first sidewall second endpoint, a mat second sidewall opposite the mat first sidewall which has a mat second sidewall first endpoint and a mat second sidewall second endpoint, a mat third sidewall connecting the mat first sidewall first endpoint to the mat second sidewall first endpoint, and a mat fourth sidewall opposite the mat third sidewall connecting the mat first sidewall second endpoint to the mat second sidewall second endpoint.

In certain embodiments the mat first sidewall includes at least one mat side assembly tab, and the mat second sidewall includes at least one mat side assembly groove. At least one mat side assembly tab is configured to slidably connect to at least one mat side assembly groove of a subsequent cargo mat.

In further embodiments the cargo management system includes a modular network of connected cargo mats where at least one mat side assembly tab of each cargo mat slidably connects to at least one mat side assembly groove of a subsequent cargo mat.

In other embodiments the mat third sidewall includes at least one mat end assembly tab, and the mat fourth sidewall comprises at least one mat end assembly groove. At least one mat end assembly tab is configured to slidably connect to at least one mat end assembly groove of a subsequent cargo mat.

In additional embodiments the cargo management system includes a modular network of connected cargo mats where at least one mat end assembly tab of each cargo mat slidably connects to at least one mat end assembly groove of a subsequent cargo mat.

In some embodiments at least one mat cavity includes at least one mat cavity sidewall and a mat cavity base extending between each mat cavity sidewall from a mat cavity sidewall juncture. At least one mat locking aperture is a through-opening in at least one mat cavity sidewall.

In other embodiments at least one mat locking aperture is a through-opening originating in the mat cavity base at the mat cavity sidewall juncture which extends partially into at least one mat cavity sidewall.

In some embodiments at least one mat cavity includes a mat cavity first sidewall which has a mat cavity first sidewall first endpoint and a mat cavity first sidewall second endpoint, a mat cavity second sidewall opposite the mat cavity first sidewall which has a mat cavity second sidewall first endpoint and a mat cavity second sidewall second endpoint, a mat cavity first endwall connecting the mat cavity first sidewall first endpoint and the mat cavity second sidewall first endpoint, and a mat cavity second endwall connecting the mat cavity first sidewall second endpoint and the mat cavity second sidewall second endpoint. The mat cavity base extends between the mat cavity first sidewall, the mat cavity second sidewall, the mat cavity first endwall, and the mat cavity second endwall from the mat cavity sidewall juncture. A first mat locking aperture is a through-opening in the mat cavity first endwall and a second mat locking aperture is a through-opening in the mat cavity second endwall.

In other embodiments the first mat locking aperture is a through-opening originating in the mat cavity base at the mat cavity sidewall juncture and extending partially into the mat cavity first endwall, and the second mat locking aperture is a through-opening originating in the mat cavity base at the mat cavity sidewall juncture and extending partially into the mat cavity second endwall.

In further embodiments the mat cavity first sidewall includes a mat cavity first sidewall first interior-point and a mat cavity first sidewall second interior-point, and the mat cavity second sidewall includes a mat cavity second sidewall first interior-point and a mat cavity second sidewall second interior-point. A mat cavity third sidewall extends from the mat cavity first sidewall first interior-point and has a mat cavity third sidewall endpoint, and a mat cavity fourth sidewall extends from the mat cavity first sidewall second interior-point opposite the mat cavity third sidewall and has a mat cavity fourth sidewall endpoint. A mat cavity third endwall connects the mat cavity third sidewall endpoint and the mat cavity fourth sidewall endpoint. A mat cavity fifth sidewall extends from the mat cavity second sidewall first interior-point and has a mat cavity fifth sidewall endpoint, and a mat cavity sixth sidewall extends from the mat cavity second sidewall second interior-point opposite the mat cavity fifth sidewall and has a mat cavity sixth sidewall endpoint. A mat cavity fourth endwall connects the mat cavity fifth sidewall endpoint and the mat cavity sixth sidewall endpoint. The mat cavity base extends between the mat cavity first sidewall, the mat cavity second sidewall, the mat cavity first endwall, the mat cavity second endwall, the mat cavity third sidewall, the mat cavity fourth sidewall, the mat cavity third endwall, the mat cavity fifth sidewall, the mat cavity sixth sidewall, and the mat cavity fourth endwall, from the mat cavity sidewall juncture. A third mat locking aperture is a through-opening in the mat cavity third endwall and a fourth mat locking aperture is a through-opening in the mat cavity fourth endwall.

In additional embodiments the first mat locking aperture is a through-opening originating in the mat cavity base at the mat cavity sidewall juncture and extending partially into the mat cavity first endwall, the second mat locking aperture is a through-opening originating in the mat cavity base at the mat cavity sidewall juncture and extending partially into the mat cavity second endwall, the third mat locking aperture is a through-opening originating in the mat cavity base at the mat cavity sidewall juncture and extending partially into the mat cavity third endwall, and the fourth mat locking aperture is a through-opening originating in the mat cavity base at the mat cavity sidewall juncture and extending partially into the mat cavity fourth endwall.

In preferred embodiments at least one cargo manager includes a cargo manager sidewall surface. At least one locking fastener extends from the cargo manager sidewall surface.

In selected embodiments the cargo management system includes an accessory which has an accessory stem. At least one cargo manager includes a cargo manager upper edge and a cargo manager top plate which has a cargo manager top surface and a cargo manager top plate inner surface. In such embodiments the cargo manager top plate may extend from the cargo manager sidewall surface at the cargo manager upper edge and may extend across the cargo manager. The cargo manager top plate may connect at least opposing locations of the cargo manager sidewall surface.

In embodiments which include an accessory, the cargo manager top plate may include an accessory aperture. The accessory stem may be configured to interact with the accessory aperture so that the accessory may be attached to and removed from the cargo manager at the cargo manager top surface.

In other selected embodiments the cargo management system may include an accessory attachment member, and the accessory stem may include a threaded rod. In such embodiments the accessory attachment member may be a threaded nut configured to removably attach to the threaded rod, and may be configured to fixedly attach to the cargo manager top plate inner surface. Preferably, the accessory attachment member aligns with the accessory aperture, and the accessory stem may pass through the accessory aperture and interact with the accessory attachment member, so that the accessory may be attached to and removed from the cargo manager.

In some embodiments the cargo management system includes at least one cargo manager connector, and at least one cargo manager includes a plurality of cargo managers. In such embodiments, the cargo manager connector may extend from a portion of the cargo manager sidewall surface of a first cargo manager, and extends between and connects to a portion of the cargo manager sidewall surface of an adjacent cargo manager.

Preferably, in embodiments which include at least one cargo manager connector and a plurality of cargo managers, no portion of the cargo manager connector extends past the mat top surface when a locking fastener extending from a cargo manager sidewall surface is attached to a mat locking aperture.

In further embodiments which include at least one cargo manager connector and a plurality of cargo managers, each cargo manager connector and the plurality of cargo managers may be integrally connected as one piece.

In some embodiments the cargo management system may include a cargo manager assembly which includes a sleeve and a cargo manager foot. The sleeve has a sleeve external surface and a sleeve internal surface, and the cargo manager foot has at least one cargo manager tab which has a tab surface. The tab surface may be configured to interact with the sleeve internal surface so that the cargo manager tab interacts via press fit with the sleeve. At least one locking fastener extends from the sleeve external surface.

In further embodiments including a cargo manager assembly having a sleeve and a cargo manager foot, the tab surface may include at least one tab protrusion extending from the tab surface. In such embodiments the tab surface may interact with the sleeve internal surface via interference press fit.

DETAILED DESCRIPTION

Figure 1:
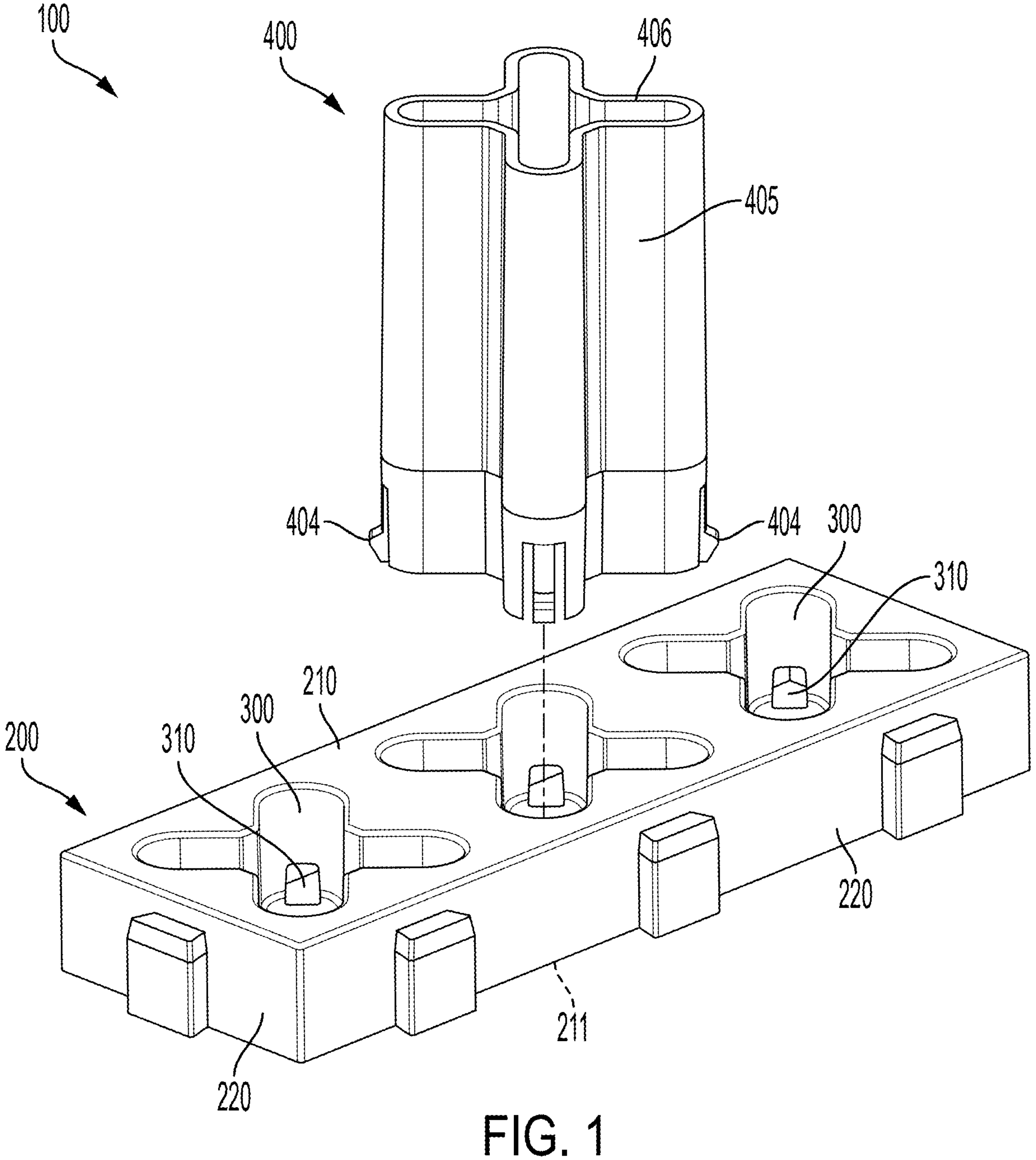
FIG. 1 is an exploded top perspective view of an exemplary embodiment of a portion of a cargo management system.

Described herein is a cargo management system. Reference is made to the figures in which, unless otherwise noted, like numbers refer to like structures. As described herein, the following numbers refer to the following structures as noted in the figures.

100 refers to a cargo management system.
200 refers to a cargo mat.
201 refers to a first cargo mat.
202 refers to a first subsequent cargo mat.
203 refers to a second subsequent cargo mat.
210 refers to a mat top surface.
211 refers to a mat bottom surface.
220 refers to a mat sidewall.
221 refers to a mat first sidewall.
222 refers to a mat first sidewall first endpoint.
223 refers to a mat first sidewall second endpoint.
224 refers to a mat second sidewall.
225 refers to a mat second sidewall first endpoint.
226 refers to a mat second sidewall second endpoint.
227 refers to a mat third sidewall.
228 refers to a mat fourth sidewall.
230 refers to a mat side assembly tab.
232 refers to a mat side assembly groove.
234 refers to a mat end assembly tab.
236 refers to a mat end assembly groove.
300 refers to a mat cavity.
310 refers to a mat locking aperture.
311 refers to a first mat locking aperture.
312 refers to a second mat locking aperture.
313 refers to a third mat locking aperture.
314 refers to a fourth mat locking aperture.
320 refers to a mat cavity sidewall.
330 refers to a mat cavity first sidewall.
331 refers to a mat cavity first sidewall first endpoint.
332 refers to a mat cavity first sidewall second endpoint.
333 refers to a mat cavity first sidewall first interior-point.
334 refers to a mat cavity first sidewall second interior-point.
340 refers to a mat cavity second sidewall.
341 refers to a mat cavity second sidewall first endpoint.
342 refers to a mat cavity second sidewall second endpoint.
343 refers to a mat cavity second sidewall first interior-point.
344 refers to a mat cavity second sidewall second interior-point.
350 refers to a mat cavity first endwall.
352 refers to a mat cavity second endwall.
354 refers to a mat cavity third endwall.
356 refers to a mat cavity fourth endwall.
360 refers to a mat cavity third sidewall.
361 refers to a mat cavity third sidewall endpoint.
362 refers to a mat cavity fourth sidewall.
363 refers to a mat cavity fourth sidewall endpoint.
364 refers to a mat cavity fifth sidewall.
365 refers to a mat cavity fifth sidewall endpoint.
366 refers to a mat cavity sixth sidewall.
367 refers to a mat cavity sixth sidewall endpoint.
370 refers to a mat cavity base.
372 refers to a mat cavity sidewall juncture.
400 refers to a cargo manager.
402 refers to a cargo manager assembly.
404 refers to a locking fastener.
405 refers to a cargo manager sidewall surface.
406 refers to a cargo manager upper edge.
407 refers to a cargo manager top plate.
408 refers to a cargo manager top surface.
409 refers to a cargo manager top plate inner surface.
410 refers to a sleeve.
412 refers to a sleeve external surface.
414 refers to a sleeve internal surface.
420 refers to a cargo manager foot.
421 refers to a cargo manager tab.
422 refers to a tab surface.
423 refers to a block plate.
424 refers to a plate top surface.
425 refers to a plate bottom surface.
426 refers to a tab protrusion.
430 refers to a cargo manager connector.
432 refers to a plurality of cargo managers.
434 refers to a first cargo manager.
436 refers to an adjacent cargo manager.
500 refers to an accessory.
502 refers to an accessory stem.
503 refers to a threaded rod.
504 refers to an accessory aperture.
506 refers to an accessory attachment member.

Figure 14:
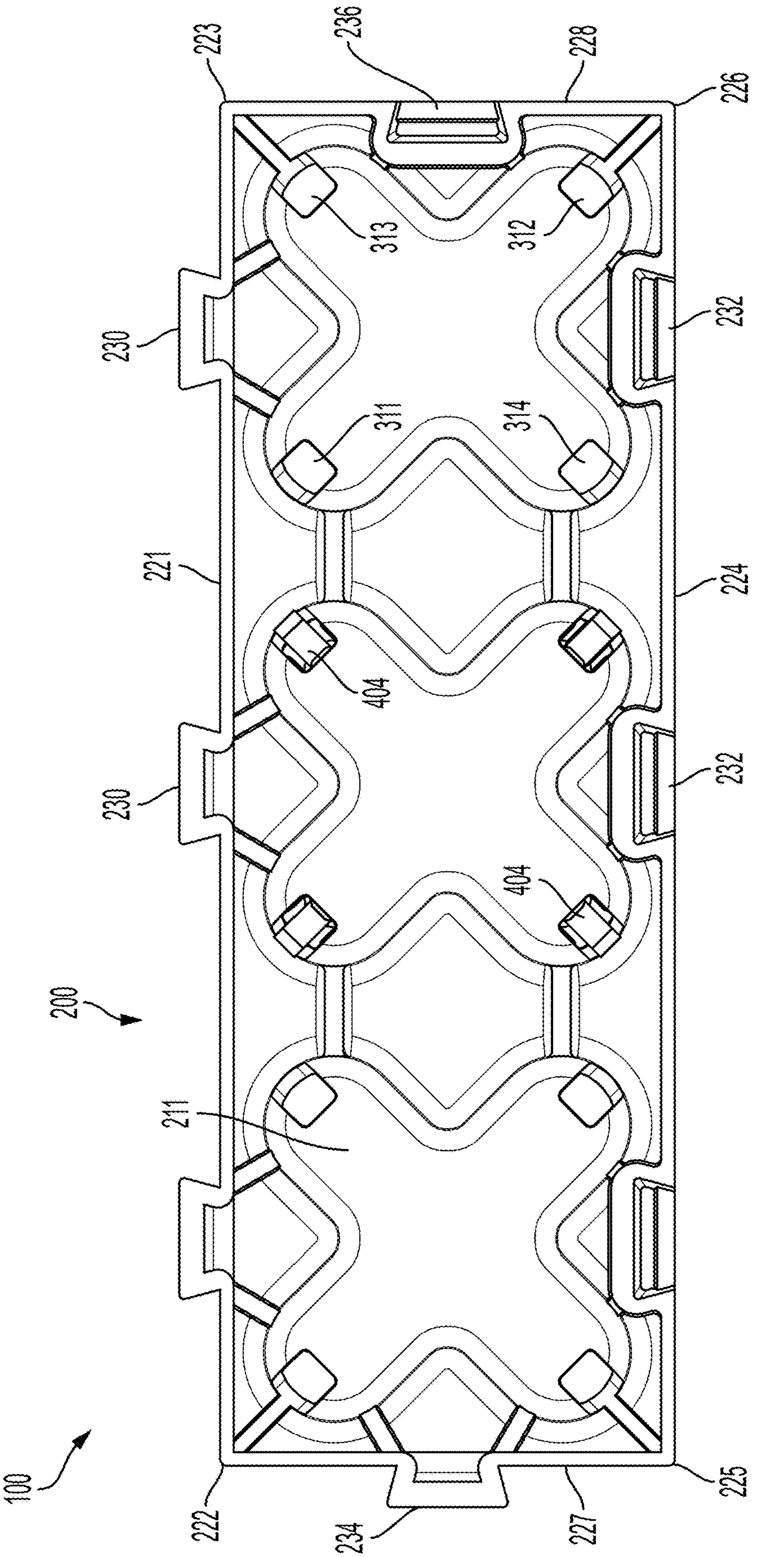
FIG. 14 is a bottom view of an exemplary embodiment of a portion of a cargo management system.

FIG. 1 illustrates an exploded top perspective view of an exemplary embodiment of a portion of a cargo management system (100) with a cargo mat (200) and a cargo manager (400). The cargo mat has a mat top surface (210), a mat bottom surface (211) (as shown in FIG. 14), at least one mat sidewall (220), and at least one mat cavity (300). The mat cavity extends from the mat top surface toward the mat bottom surface, and has at least one mat locking aperture (310). The cargo manager has at least one locking fastener (404) which extends from a cargo manager sidewall surface (405). The cargo manager is configured to interact with the mat cavity such that the at least one locking fastener may securely attach to the at least one mat locking aperture.

Figure 2:
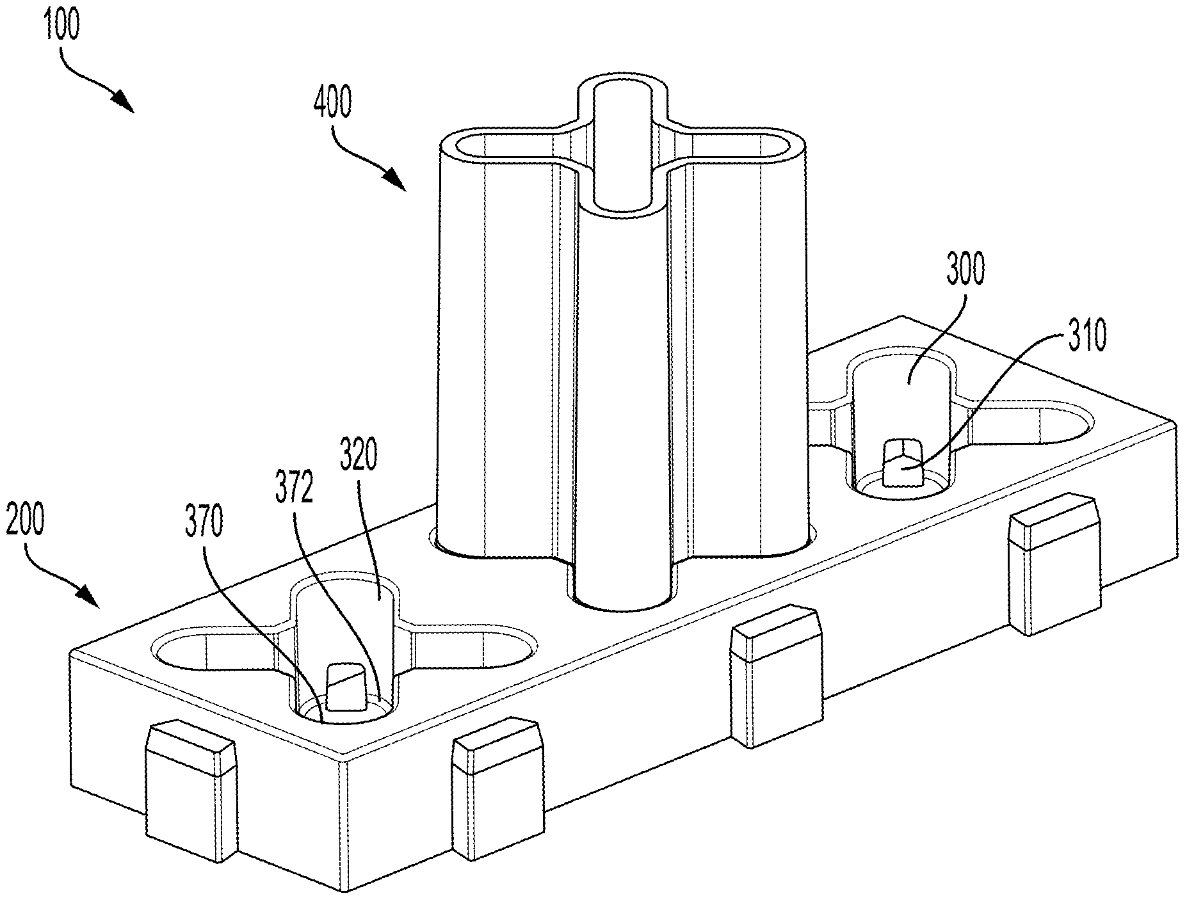
FIG. 2 is an assembled top perspective view of an exemplary embodiment of a portion of a cargo management system.

As shown in FIG. 2, in some embodiments the at least one mat cavity (300) may have at least one mat cavity sidewall (320) and a mat cavity base (370) which extends between any such mat cavity sidewall(s) from a mat cavity sidewall juncture (372). In such embodiments the at least one mat locking aperture (310) may be a through-opening in at least one mat cavity sidewall. Alternatively, the mat locking aperture may be a through-opening originating in the mat cavity base at the mat cavity sidewall juncture, extending partially into at least one mat cavity sidewall.

Preferably, no portion of the cargo manager assembly (400) will extend past the mat bottom surface (211) (as shown in FIG. 14) when the at least one locking fastener (404) is attached to the at least one mat locking aperture (310). This lack of extending past the mat bottom surface may be accomplished where the solid portion of the mat cavity base (370) prevents the cargo manager assembly from passing completely through it.

Figure 8:
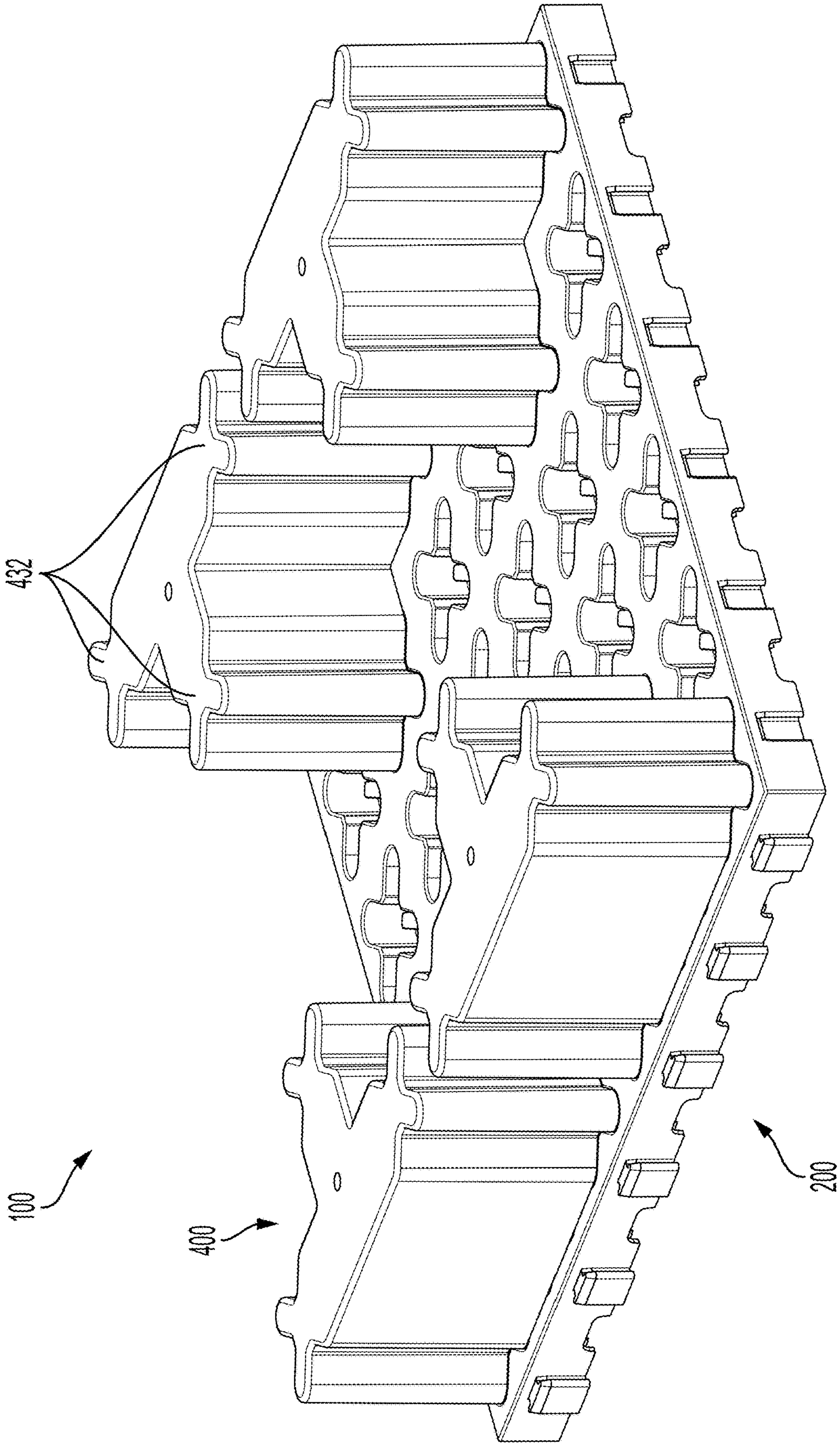
FIG. 8 is an assembled top perspective view of an exemplary embodiment of a portion of a cargo management system.
Figure 9:
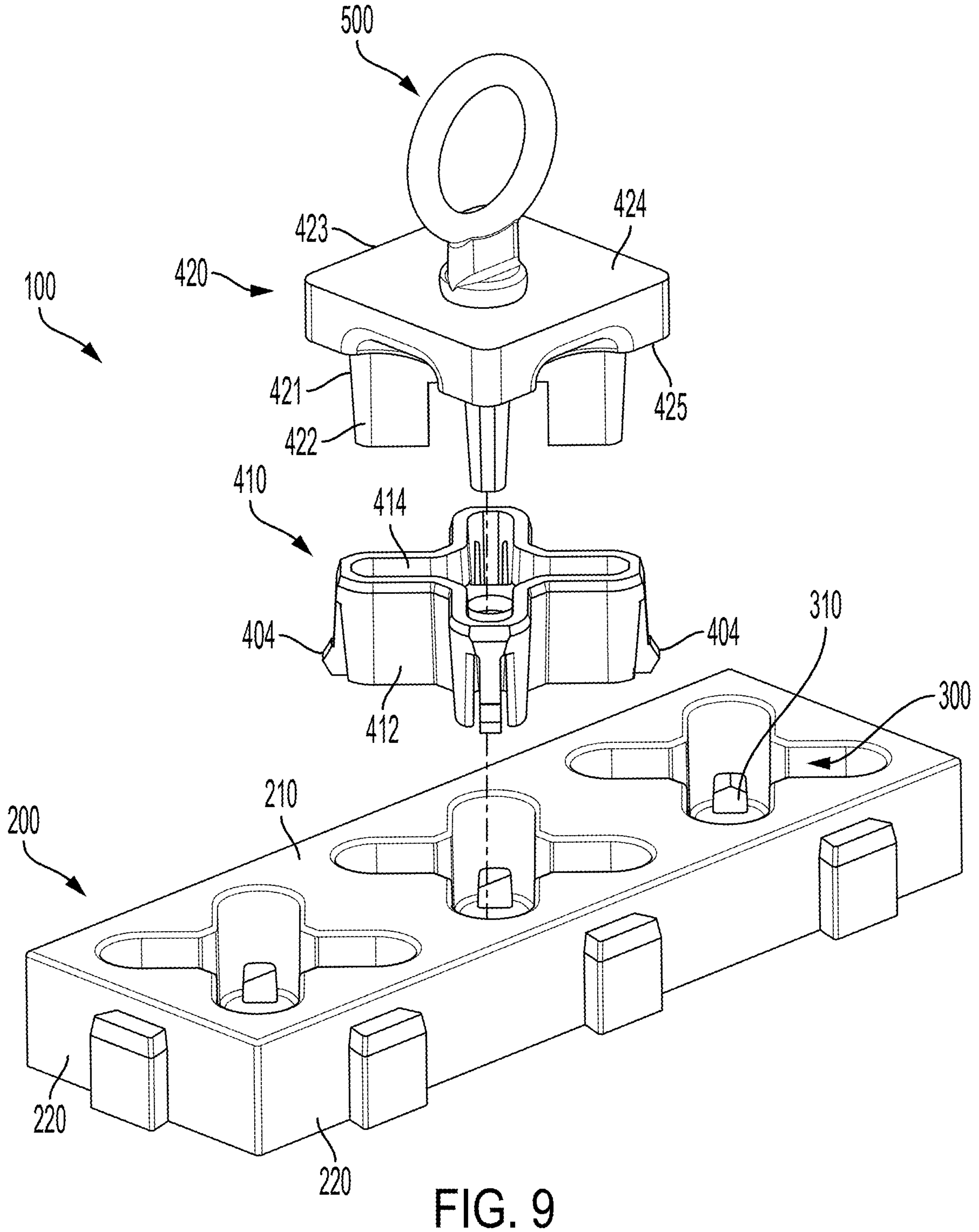
FIG. 9 is an exploded top perspective view of an exemplary embodiment of a portion of a cargo management system.
Figure 10B:
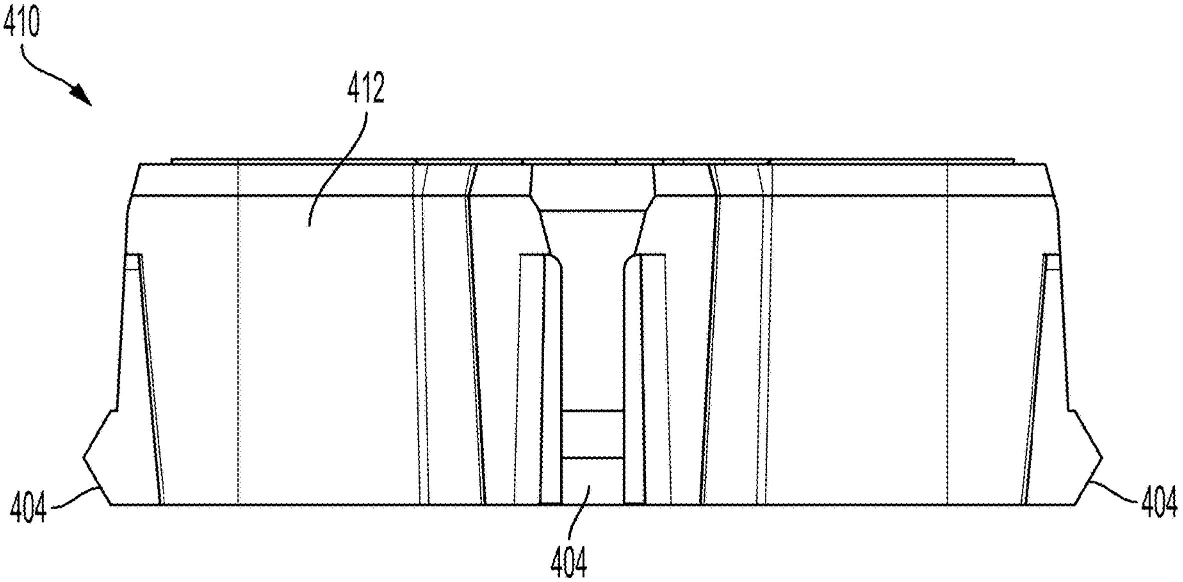
FIG. 10B is a close up side view of an exemplary embodiment of a sleeve.
Figure 11:
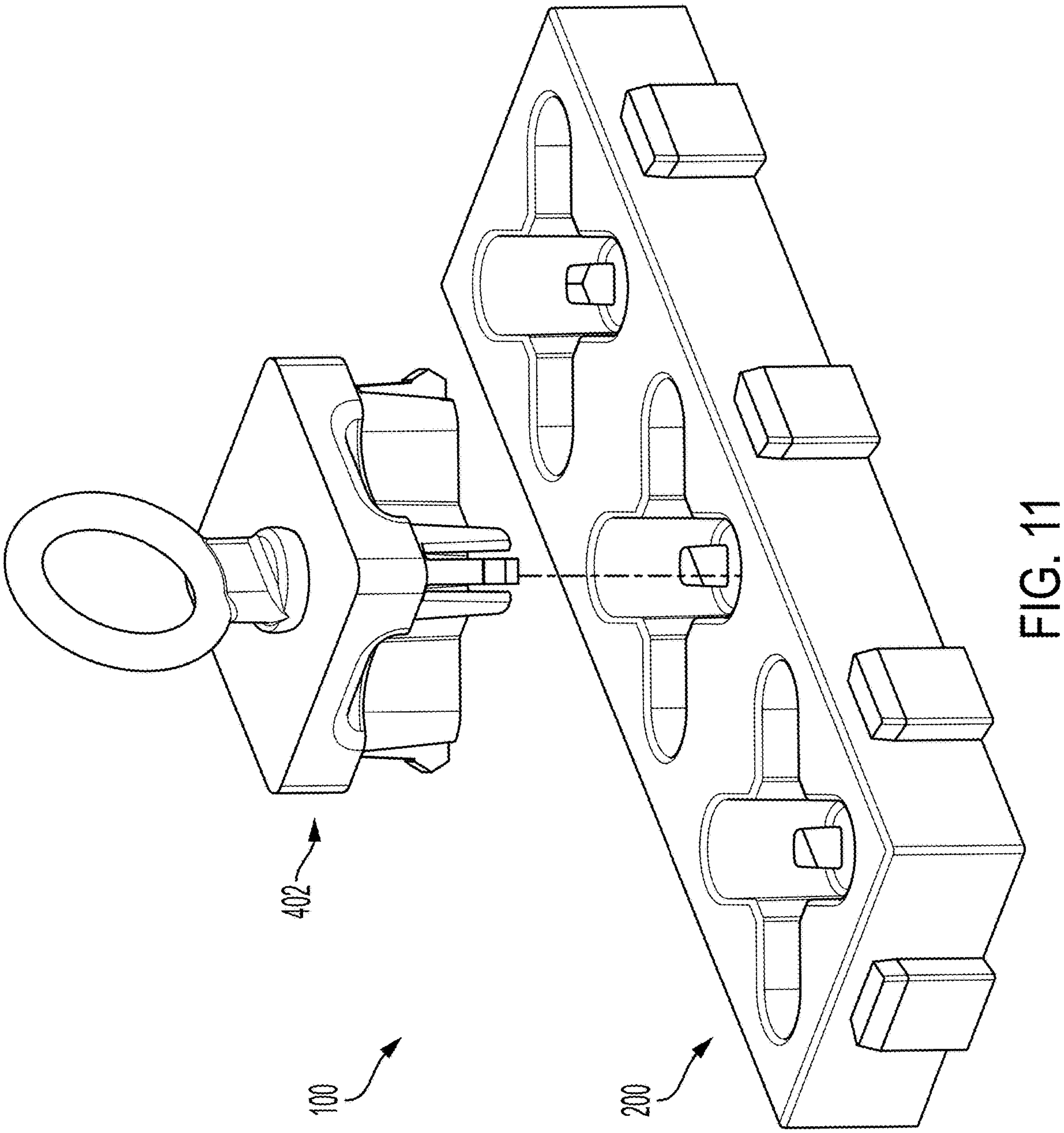
FIG. 11 is a partially exploded top perspective view of an exemplary embodiment of a portion of a cargo management system.
Figure 12:
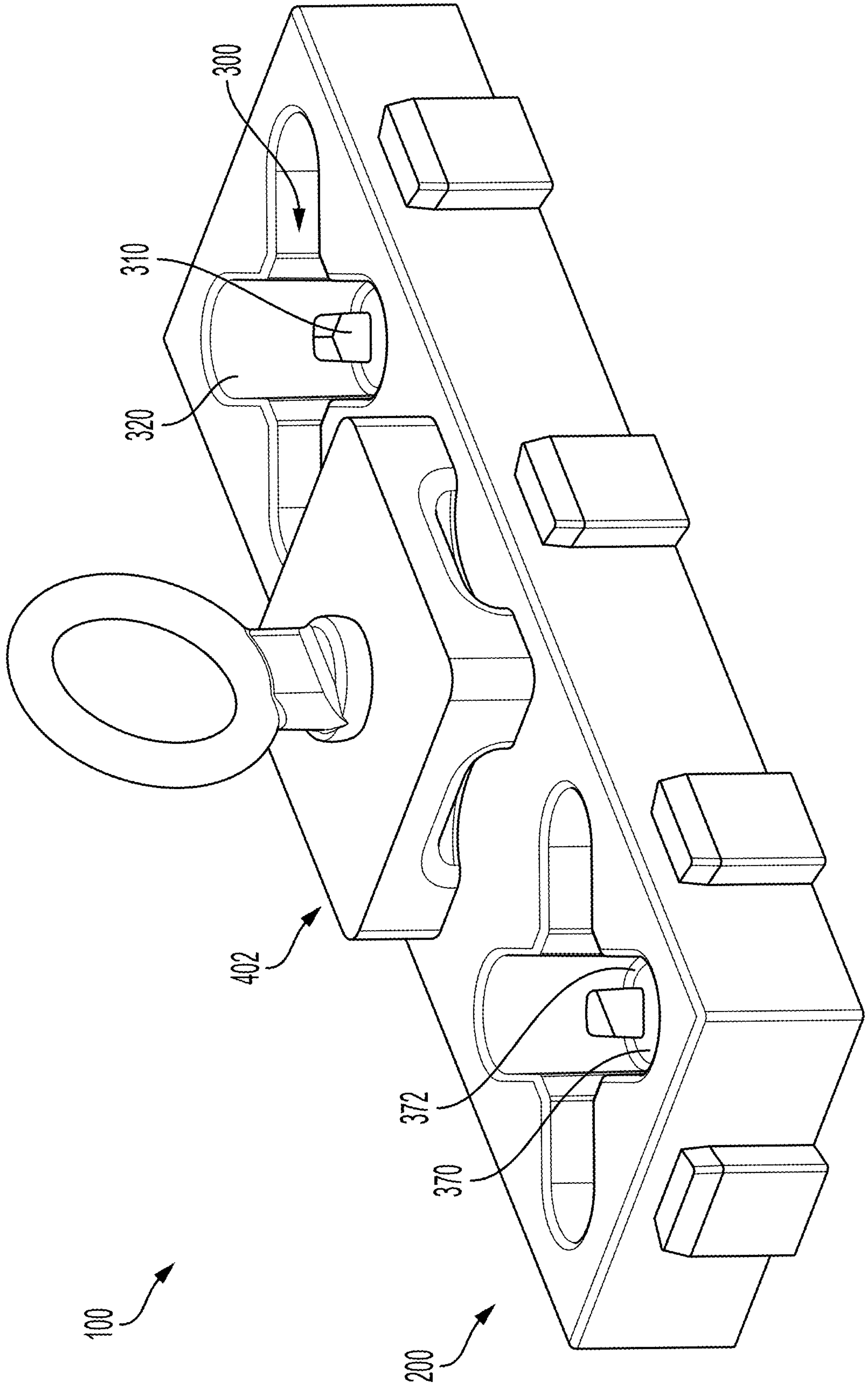
FIG. 12 is an assembled top perspective view of an exemplary embodiment of a portion of a cargo management system.
Figure 15A:
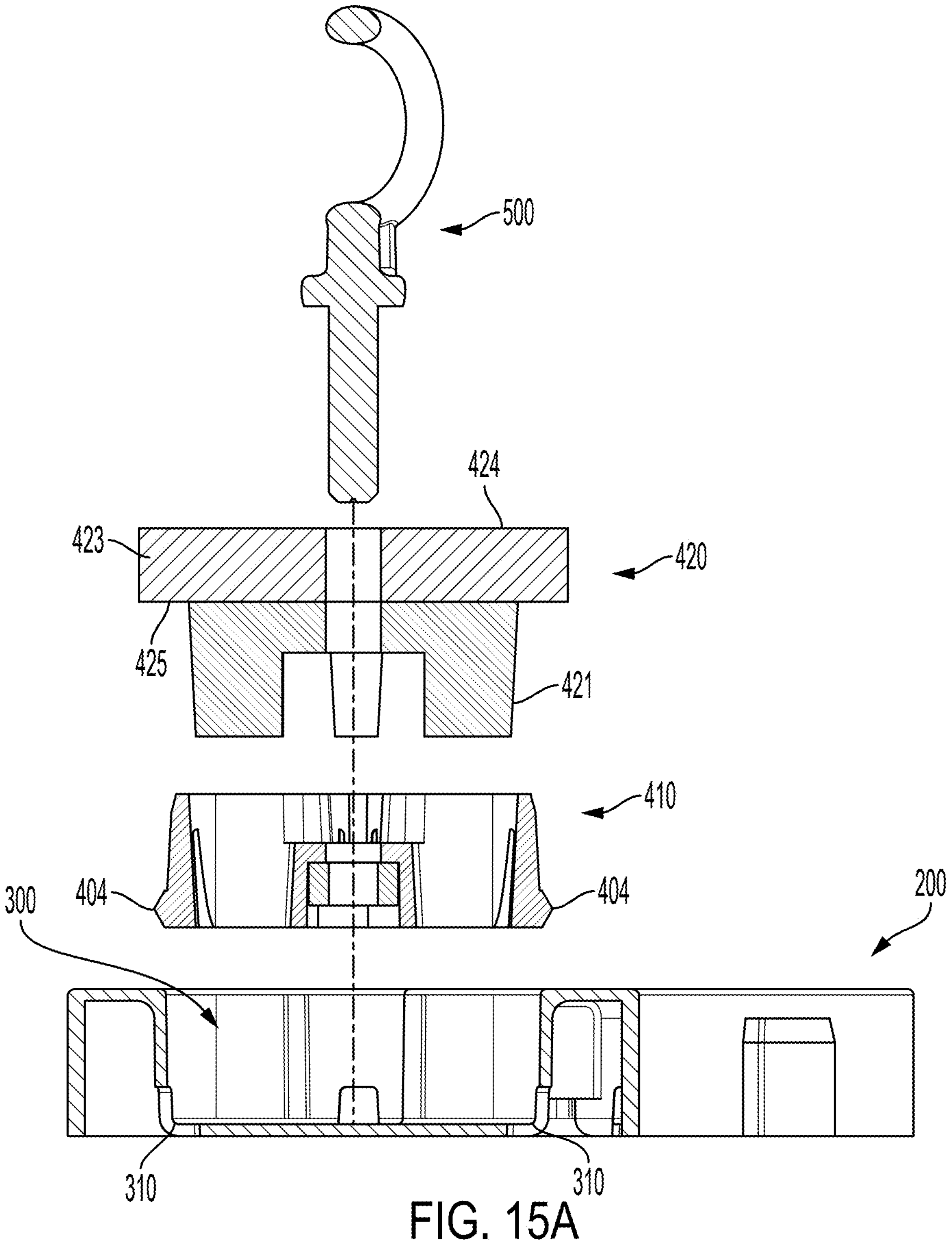
FIG. 15A is an exploded cross section of an exemplary embodiment of a portion of a cargo management system.
Figure 15B:
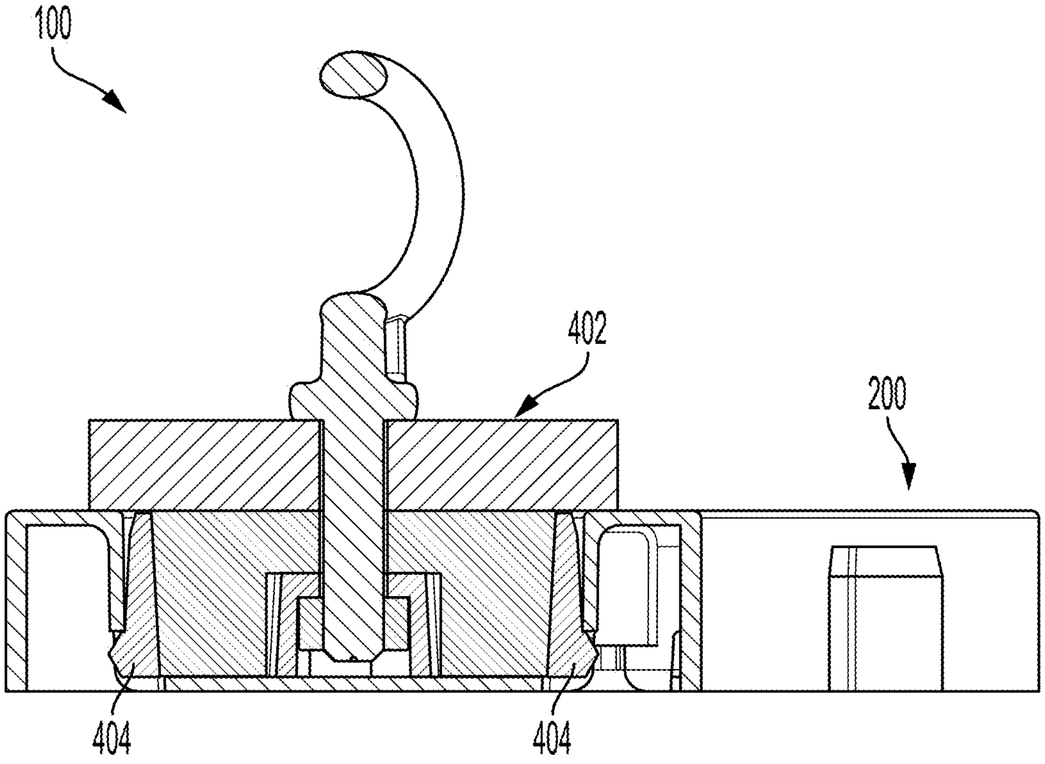
FIG. 15B is an assembled cross section of an exemplary embodiment of a portion of a cargo management system.

In some embodiments the locking fastener (404) may be a push-pull clip fastener, as shown in the figures. Such a push-pull clip fastener may have a tab (extending from the cargo manager sidewall surface (405), or the sleeve external surface (412) (as shown in FIGS. 9 and 10B), and a leg (disposed on the cargo manager sidewall surface or the sleeve external surface). In the presence of such a push-pull clip fastener, the cargo manager sidewall surface (or the sleeve external surface, as the case may be) may comprise gaps or apertures disposed alongside both sides of the push-pull clip fastener's leg, allowing the push-pull clip fastener's tab and leg to flex into the cargo manager sidewall surface (or the sleeve external surface, as the case may be) when the fastener is under external force, and to extend back to its original position when such force is removed. Such an external force may be exerted on the push-pull clip fastener by the mat cavity sidewall (320) when the cargo manager (400) (or the cargo manager assembly (402) as shown in FIG. 11, as the case may be) is inserted into the mat cavity (300) (as shown in FIGS. 2, 8, and 12), and such force is removed when the tab engages the mat locking aperture (310) (as shown in FIGS. 15A and 15B). Examples of fasteners in other embodiments include, but are not limited to, tabbed snap-lock fasteners, spring-loaded button or latch fasteners, lever-lock fasteners, screw-lock fasteners, lock-and-key fasteners, or the like.

FIG. 2 illustrates an assembled top perspective view of an exemplary embodiment of a portion of a cargo management system (100) with a cargo mat (200) and a cargo manager (400).

Figure 3:
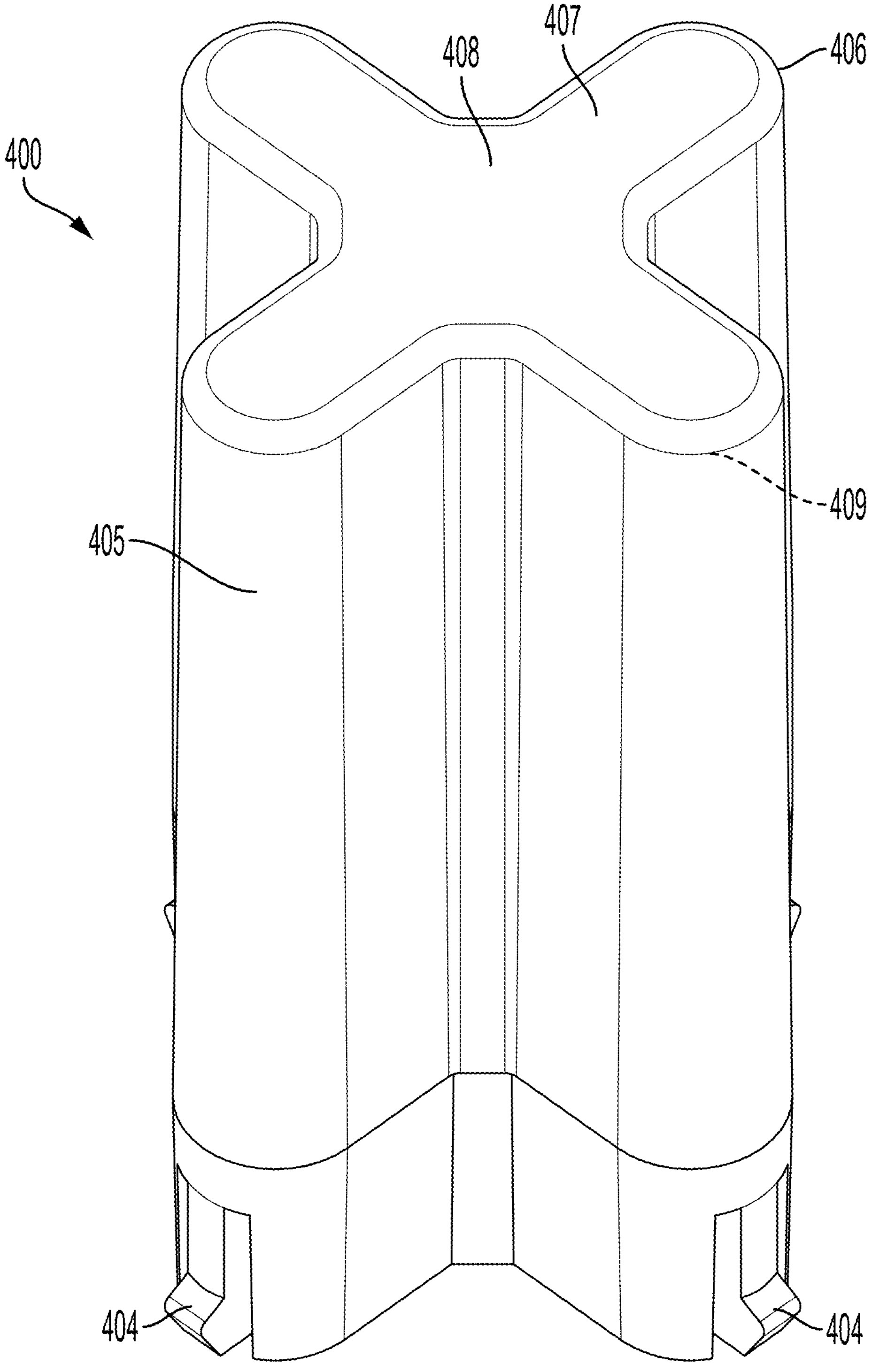
FIG. 3 is a perspective view of an exemplary embodiment of a cargo manager.
Figure 5:
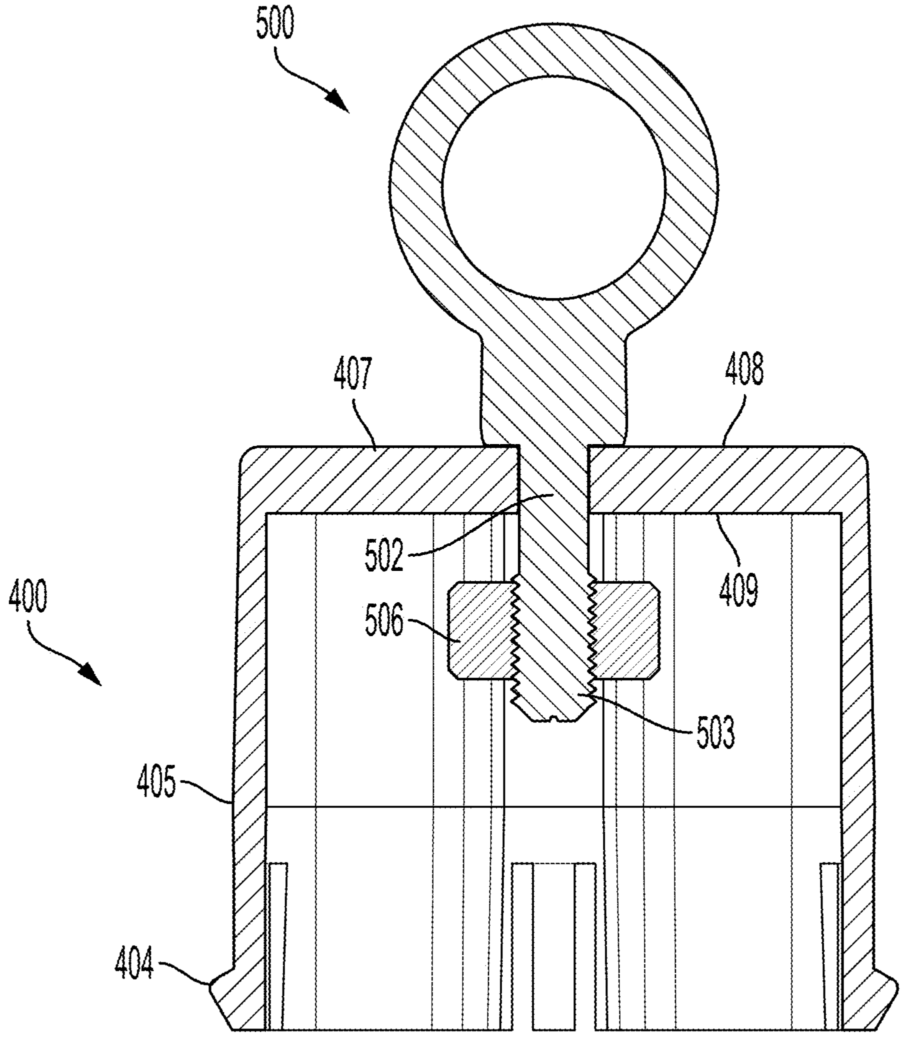
FIG. 5 is an assembled cross section of an exemplary embodiment of a portion of a cargo management system.

FIG. 3 illustrates a perspective view of an exemplary embodiment of a cargo manager (400) having a cargo manager sidewall surface (405) and a cargo manager upper edge (406). The cargo manager may additionally have a cargo manager top plate (407), a cargo manager top surface (408), and a cargo manager top plate inner surface (409) (as shown in FIG. 5), which extend at least across the cargo manager from the cargo manager sidewall surface at the cargo manager upper edge. The cargo manager sidewall surface may circumvent the at least one cargo manager, thus defining the entire area of the external sidewall surface thereof.

Figure 4:
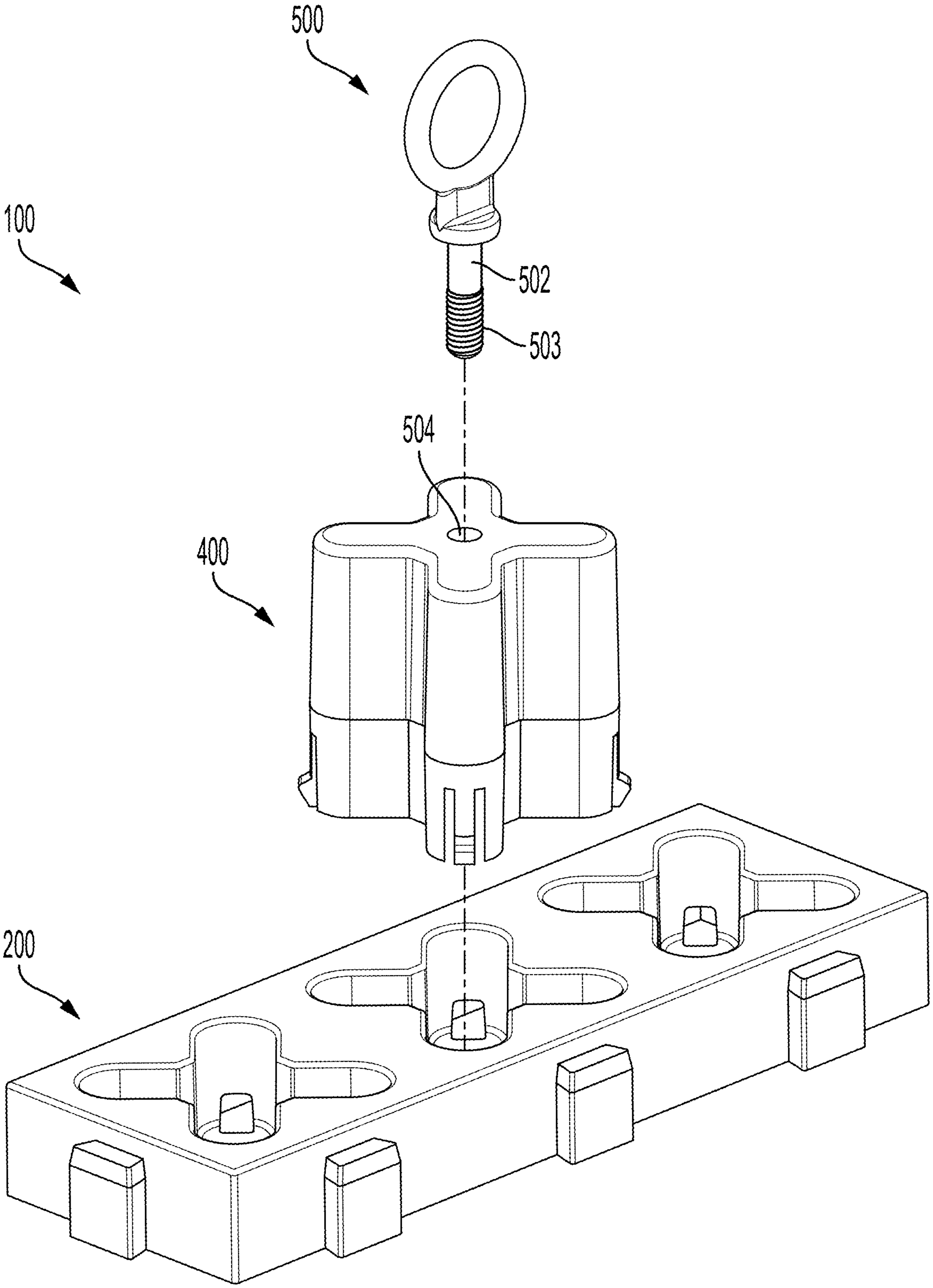
FIG. 4 is an exploded top perspective view of an exemplary embodiment of a portion of a cargo management system.

FIG. 4 illustrates an exploded top perspective view of a portion of an exemplary embodiment of a cargo management system (100) with a cargo mat (200), a cargo manager (400), and an accessory (500). The accessory may have an accessory stem (502), which may have a threaded rod (503) disposed there-along. The cargo manager may have an accessory aperture (504), which may be configured to interact with the accessory stem, the threaded end, or both, in such a way as to removably attach the accessory to the cargo manager.

As seen in FIG. 4, the accessory (500) may be an eyelet or eyehook. Other examples of accessories include, but are not limited to, hooks, chains manufactured of various materials, straps or cords having elastic properties, blocks having rectangular or varying surface profiles, wedges having varying surface profiles, walls being planar or non-planar, etc., to locate or secure cargo in place during use of the cargo management system.

FIG. 5 illustrates an assembled cross section of an exemplary embodiment of a cargo manager (400) and an accessory (500). The cargo manager may have a cargo manager top plate (407), a cargo manager top surface (408), and cargo manager top plate inner surface (409). The accessory may have an accessory stem (502), which may further have a threaded rod (503). An accessory attachment member (506) may be disposed along the cargo manager top plate inner surface, and be so disposed as to interact with the accessory stem in such a way that the accessory may removably attach to the cargo manger.

As demonstrated in FIG. 5, the accessory attachment member (506) may be a nut configured to interact with a threaded rod (503) which is disposed along the accessory stem (502). In other embodiments, the combination of the accessory stem and the accessory attachment member may constitute fins and slots, various spring-loaded clips and recesses or grooves, key-lock activated systems, or the like.

Figure 6:
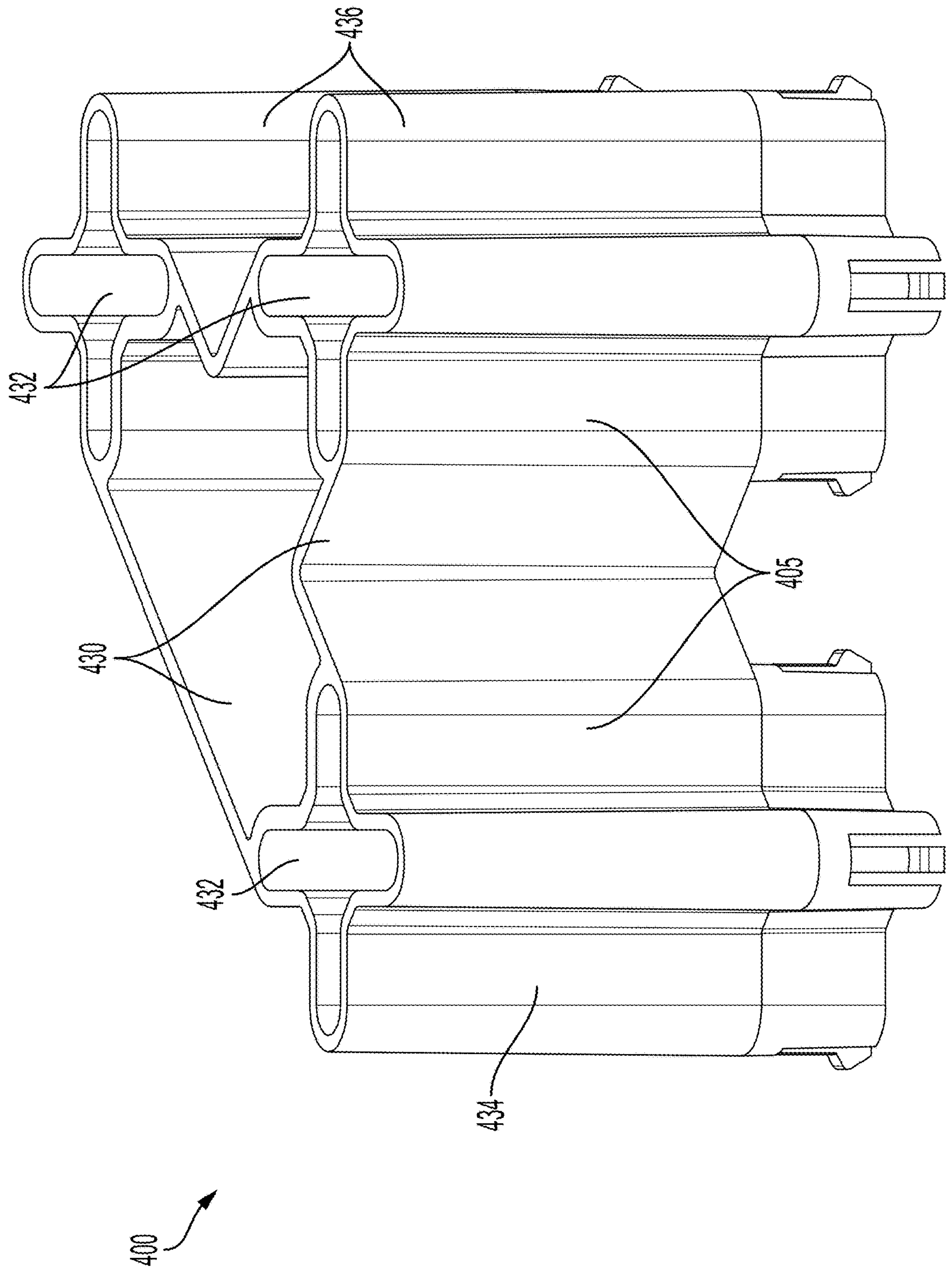
FIG. 6 is a perspective view of an exemplary embodiment of a cargo manager.

FIG. 6 illustrates a perspective view of a plurality of cargo managers (432) having at least one cargo manager connector (430). The cargo manager connector extends from at least a portion of the cargo manager sidewall surface (405) of a first cargo manager (434), and connects the first cargo manager to at least one adjacent cargo manager (436).

Figure 7:
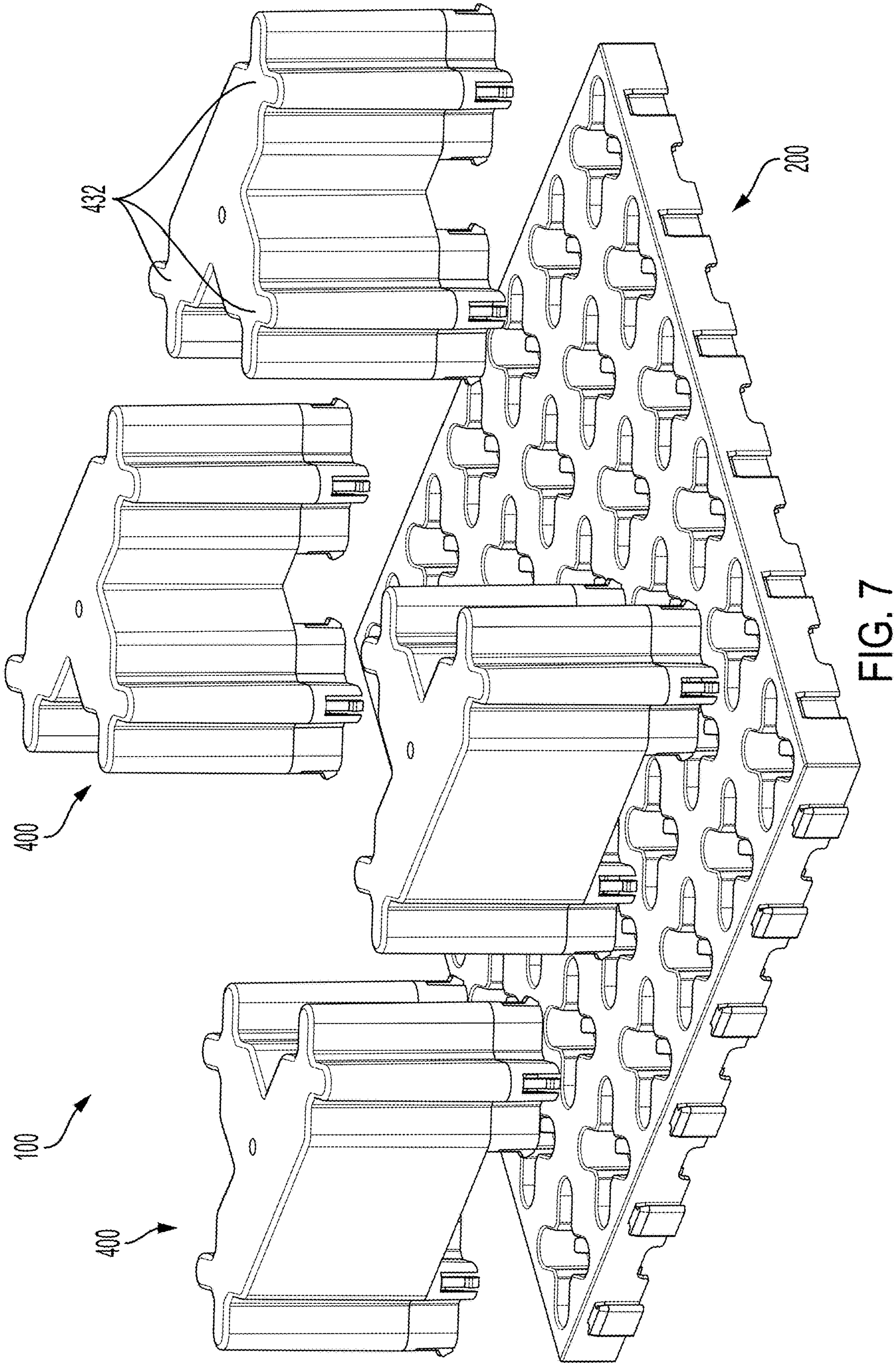
FIG. 7 is an exploded top perspective view of an exemplary embodiment of a portion of a cargo management system.

In some embodiments, the plurality of cargo managers (432) and all of the at least one cargo manager connector (430) are integrally connected as one piece. As shown in FIGS. 6, 7, and 8, each cargo manager (400) comprised of a plurality of cargo managers and at least one cargo manager connector is molded as one piece. In other embodiments, at least one cargo manager connector may be selected from a group including, but not limited to, plastic rods or plates, metal rods or plates, and elastic bands, any of which may be fastened to a cargo manager sidewall surface (405) by molding, gluing, melting, screwing, bolting, or any like process.

FIGS. 7 and 8 illustrate an exploded top perspective view, and an assembled top perspective view, respectively, of an exemplary embodiment of a portion of a cargo management system (100) with a cargo mat (200) and at least one cargo manager (400) comprising a plurality of cargo managers (432).

Preferably, as demonstrated in FIG. 8, no portion of the at least one cargo manager connector (430 will extend past the mat top surface (210) when the at least one locking fastener (404) is engaged with the at least one mat locking aperture (310).

FIG. 9 illustrates an exploded top perspective view of an exemplary embodiment of a portion of a cargo management system (100) with a cargo mat (200), a sleeve (410), a cargo manager foot (420), and an accessory (500). The sleeve has at least one locking fastener (404) which extends from a sleeve external surface (412), and also has a sleeve internal surface (414). The cargo manager foot has at least one cargo manager tab (421) having a tab surface (422); and may additionally have a cargo manager plate (423) having a plate top surface (424) and a plate bottom surface (425) (also as shown in FIG. 15A). The cargo manager tab extends from an area of the plate bottom surface which is smaller than the total area of the plate bottom surface. The tab surface is configured to interact with the sleeve internal surface such that the cargo manager tab is configured to press fit into the sleeve, thus forming a cargo manager assembly (402) (as shown in FIG. 11). The cargo manager assembly is configured to interact via slide fit with the mat cavity (300) such that the at least one locking fastener may securely attach to the at least one mat locking aperture (310).

In preferred embodiments, where no portion of the cargo manager assembly extends past the mat bottom surface (211) (as shown in FIG. 14) when the at least one locking fastener (404) is attached to the at least one mat locking aperture (310), said lack of extending past the mat bottom surface may be accomplished where the height of the cargo manager tab (421), the sleeve (410), or both, are less than the depth of the mat cavity (300); or; the area of the plate bottom surface (425) is greater than the area of the opening of the mat cavity; or both, thus preventing said extension past the mat bottom surface.

Figure 10A:
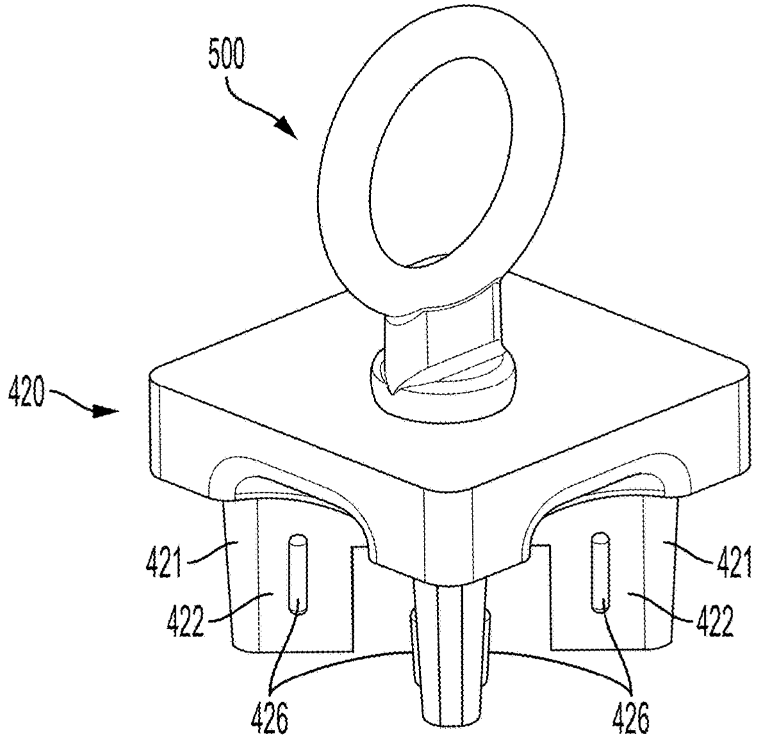
FIG. 10A is a close up perspective side view of an exemplary embodiment of a cargo manager foot.

FIG. 10A illustrates a close up perspective side view of an exemplary embodiment of a cargo manager foot (420), having a cargo manager tab (421), having a tab surface (422). In some embodiments at least one tab protrusion (426) may extend from the tab surface. In such embodiments, the tab surface comprising a tab protrusion interacts with the sleeve internal surface (414) via interference press fit when the cargo manager foot is engaged with the sleeve (410), forming a cargo manager assembly (402).

FIG. 10B illustrates a close up side view of an exemplary embodiment of a sleeve (410) having at least one locking fastener (404) extending from the sleeve external surface (412).

FIGS. 11 and 12 illustrate a partially exploded top perspective view, and an assembled top perspective view. respectively, of an exemplary embodiment of a portion of a cargo management system (100) with a cargo manager assembly (402).

Figure 13:
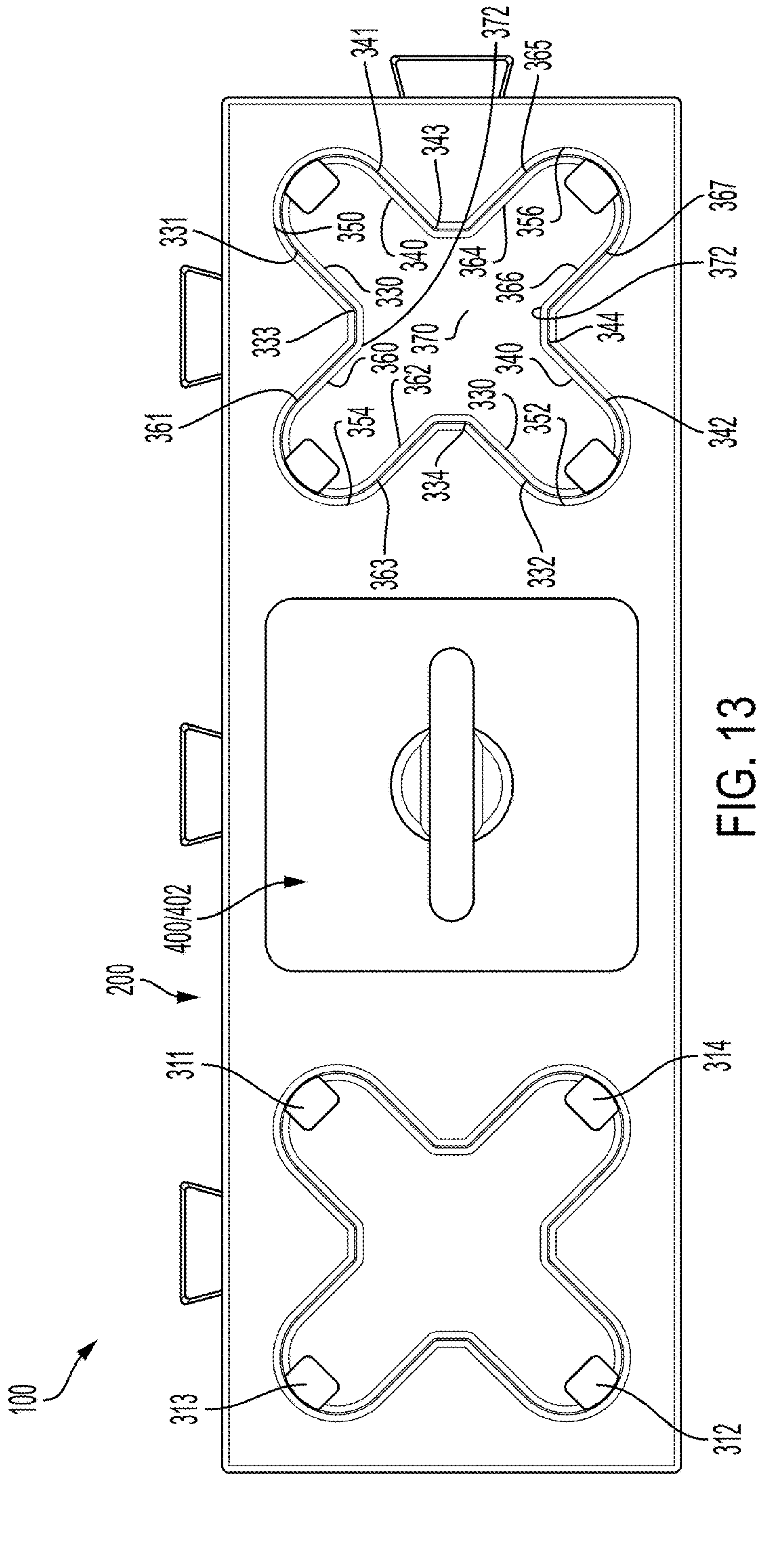
FIG. 13 is top view of an exemplary embodiment of a portion of a cargo management system.

FIG. 13 illustrates a top view of an exemplary embodiment of a portion of a cargo management system (100) with a cargo mat (200), a cargo manager (400) (or a cargo manager assembly (402), as the case may be) inserted into a mat cavity ((300) as shown in FIGS. 1 and 2), showing additional features of the at least one mat cavity as described herein. In some embodiments at least one mat cavity may have at least one mat cavity sidewall (320) and a mat cavity base (370) which extends between any such mat cavity sidewall(s) from a mat cavity sidewall juncture (372), as shown in FIGS. 2 and 12. In such embodiments the at least one mat locking aperture ((310) as shown in FIGS. 2 and 12) may be a through-opening in at least one mat cavity sidewall. Alternatively, the mat locking aperture may be a through-opening originating in the mat cavity base at the mat cavity sidewall juncture, extending partially into at least one mat cavity sidewall.

In some embodiments at least one mat cavity (300) may have a mat cavity first sidewall (330) which has a mat cavity first sidewall first endpoint (331) and a mat cavity first sidewall second endpoint (332); a mat cavity second sidewall (340), being opposite the mat cavity first sidewall, which has a mat cavity second sidewall first endpoint (341) and a mat cavity second sidewall second endpoint (342); a mat cavity first endwall (350) which extends between and connects the mat cavity first sidewall first endpoint and the mat cavity second sidewall first endpoint; and a mat cavity second endwall (352) which extends between and connects the mat cavity first sidewall second endpoint and the mat cavity second sidewall second endpoint, thus forming a substantially 'I'-shaped mat cavity. In such embodiments the mat cavity base (370) may extend between and connect the mat cavity first sidewall, the mat cavity second sidewall, the mat cavity first endwall, and the mat cavity second endwall from the mat cavity sidewall juncture (372). The mat cavity first endwall and the mat cavity second endwall may, each or either, be curved, as shown in the figures, or may, each or either, be planar.

In some embodiments, a first mat locking aperture (311) may include a through-opening in the mat cavity first endwall (350) and a second mat locking aperture (312) may include a through-opening in the mat cavity second endwall (352) (as the mat locking aperture (310) is a through-opening in the mat cavity sidewall (320) as shown in FIGS. 2 and 12). In other embodiments, the first mat locking aperture may be a through-opening which originates in the mat cavity base (370) at the mat cavity sidewall juncture (372) and extends partially into the mat cavity first endwall, and the second mat locking aperture may be a through-opening which originates in the mat cavity base at the mat cavity sidewall juncture and extends partially into the mat cavity second endwall (as the mat locking aperture is a through-opening which originates in the mat cavity base at the mat cavity sidewall juncture and extends partially into the mat cavity sidewall as shown in FIGS. 2 and 12).

As shown in FIG. 13, in some embodiments the mat cavity first sidewall (330) may have a mat cavity first sidewall first interior-point (333) and a mat cavity first sidewall second interior-point (334); a mat cavity third sidewall (360) may extend from the mat cavity first sidewall first interior-point and have a mat cavity third sidewall endpoint (361); a mat cavity fourth sidewall (362) may extend from the mat cavity first sidewall second interior-point, opposite the mat cavity third sidewall, and may have a mat cavity fourth sidewall endpoint (363); and a mat cavity third endwall (354) may extend between and connect the mat cavity third sidewall endpoint and the mat cavity fourth sidewall endpoint; thus forming a substantially 'T' shaped mat cavity. In such embodiments the mat cavity base (370) may extend between and connect the mat cavity first sidewall, the mat cavity second sidewall (340), the mat cavity first endwall (350), the mat cavity second endwall (352), the mat cavity third sidewall, the mat cavity fourth sidewall, and the mat cavity third endwall, from the mat cavity sidewall juncture (372). The mat cavity third endwall may be curved, as shown in the figures, or may be planar.

As shown in FIG. 13, in embodiments having a mat cavity third sidewall (360), a mat cavity fourth sidewall (362), and a mat cavity third endwall (354); the mat cavity second sidewall (340) may have a mat cavity second sidewall first interior-point (343) and a mat cavity second sidewall second interior-point (344); a mat cavity fifth sidewall (364) may extend from the mat cavity second sidewall first interior-point and may have a mat cavity fifth sidewall endpoint (365); a mat cavity sixth sidewall (366) may extend from the mat cavity second sidewall second interior-point, opposite the mat cavity fifth sidewall, and may have a mat cavity sixth sidewall endpoint (367); and a mat cavity fourth endwall (356) may extend between and connect the mat cavity fifth sidewall endpoint and the mat cavity sixth sidewall endpoint; thus forming a substantially 'X' shaped mat cavity. In such embodiments the mat cavity base (370) may extend between and connect the mat cavity first sidewall (330), the mat cavity second sidewall, the mat cavity first endwall (350), the mat cavity second endwall (352), the mat cavity third sidewall, the mat cavity fourth sidewall, the mat cavity third endwall, the mat cavity fifth sidewall, the mat cavity sixth sidewall, and the mat cavity fourth endwall, from the mat cavity sidewall juncture (372). The mat cavity fourth endwall may be curved, as shown in the figures, or may be planar.

In further embodiments a third mat locking aperture (313) may include a through-opening in the mat cavity third endwall (354) and a fourth mat locking aperture (314) may include a through-opening in the mat cavity fourth endwall (356) (as the mat locking aperture (310) is a through-opening in the mat cavity sidewall (320) as shown in FIGS. 2 and 12). In additional embodiments, the third mat locking aperture may be a through-opening which originates in the mat cavity base (370) at the mat cavity sidewall juncture (372) and extends partially into the mat cavity third endwall, and the fourth mat locking aperture may be a through-opening which originates in the mat cavity base at the mat cavity sidewall juncture and extends partially into the mat cavity fourth endwall. (as the mat locking aperture is a through-opening which originates in the mat cavity base at the mat cavity sidewall juncture and extends partially into the mat cavity sidewall as shown in FIGS. 2 and 12).

FIG. 14 illustrates a bottom view of an exemplary embodiment of a portion of a cargo management system (100) with a cargo mat (200) having a mat bottom surface (211) and a plurality of mat locking apertures ((310) as shown in FIGS. 2 and 12; or comprising any or all of a first mat locking aperture (311), a second mat locking aperture (312), a third mat locking aperture (313), and a fourth mat locking aperture (314), as shown in FIGS. 13 and 14) which may interact with a plurality of locking fasteners (404). In some embodiments the cargo mat may have a mat first sidewall (221) having a mat first sidewall first endpoint (222) and a mat first sidewall second endpoint (223), and a mat second sidewall (224), being opposite the mat first sidewall, having a mat second sidewall first endpoint (225) and a mat second sidewall second endpoint (226). In such embodiments the cargo mat may also have a mat third sidewall (227) which extends from and connects the mat first sidewall first endpoint to the mat second sidewall first endpoint; and a mat fourth sidewall (228), being opposite the mat third sidewall, which extends from and connects the mat first sidewall second endpoint to the mat second sidewall second endpoint.

In some embodiments, as shown in FIG. 14, the cargo mat (200) has at least one mat side assembly tab (230) extending from the mat first sidewall (221), and at least one mat side assembly groove (232) extending into the mat second sidewall (224). Each such mat side assembly tab is configured to slidably connect to a mat side assembly groove of a subsequent cargo mat.

Figure 16:
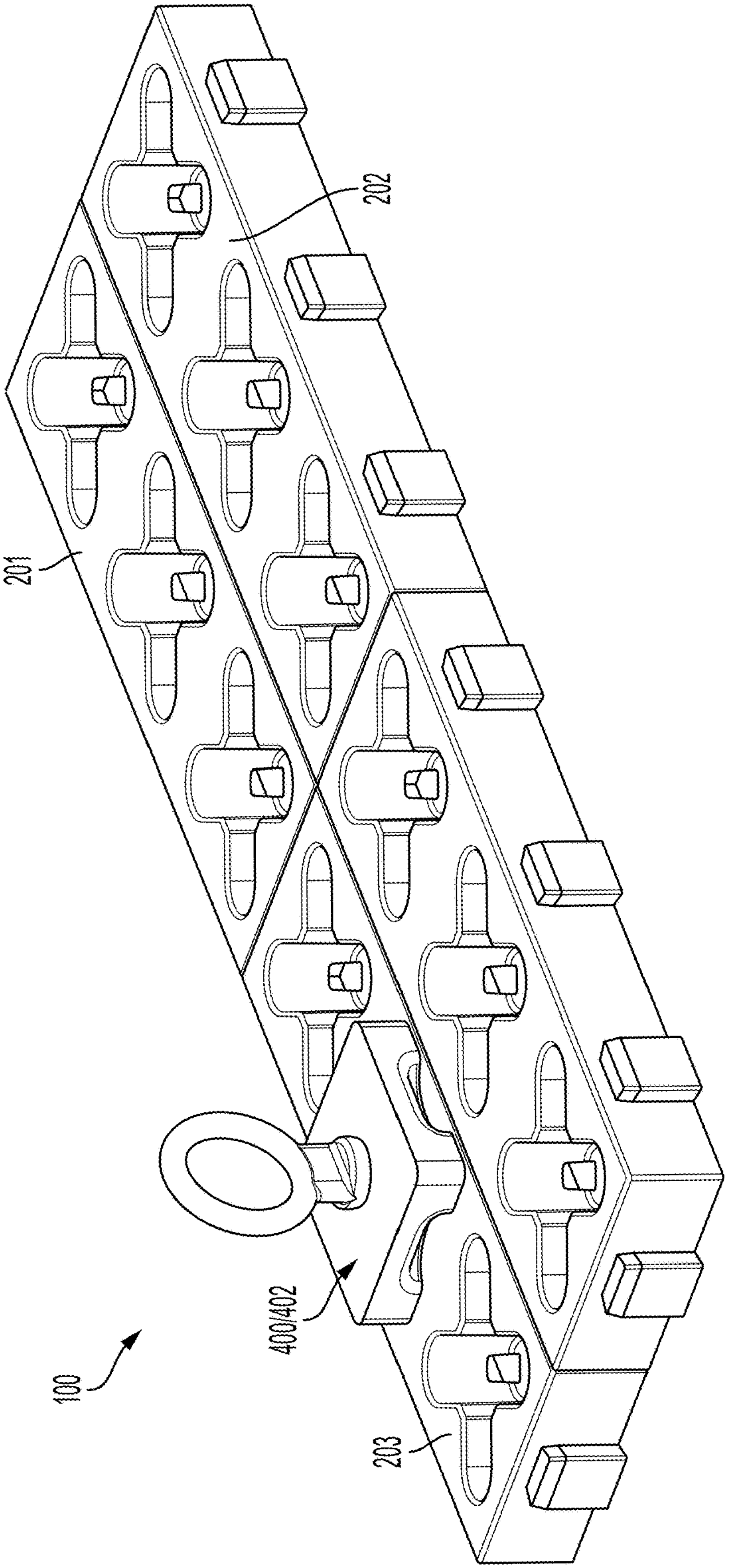
FIG. 16 is an exemplary embodiment of a cargo management system showing multiple cargo mats assembled into a modular network.

In further embodiments at least one mat side assembly tab (230) of a first cargo mat (201) interacts with at least one mat side assembly groove (232) of a first subsequent cargo mat (202) to form a modular network of connected cargo mats (as shown in FIG. 16).

As shown in FIG. 14, in some embodiments the cargo mat (200) has at least one mat end assembly tab (234) extending from the mat third sidewall (227), and at least one mat end assembly groove (236) extending into the mat fourth sidewall (228). Each such mat end assembly tab is configured to slidably connect to a mat end assembly groove of a subsequent cargo mat.

In further embodiments at least one mat end assembly tab (234) of a first cargo mat (201) interacts with at least one mat end assembly groove (236) of a second subsequent cargo mat (203) to form a modular network of connected cargo mats (as shown in FIG. 16).

Figure 17:
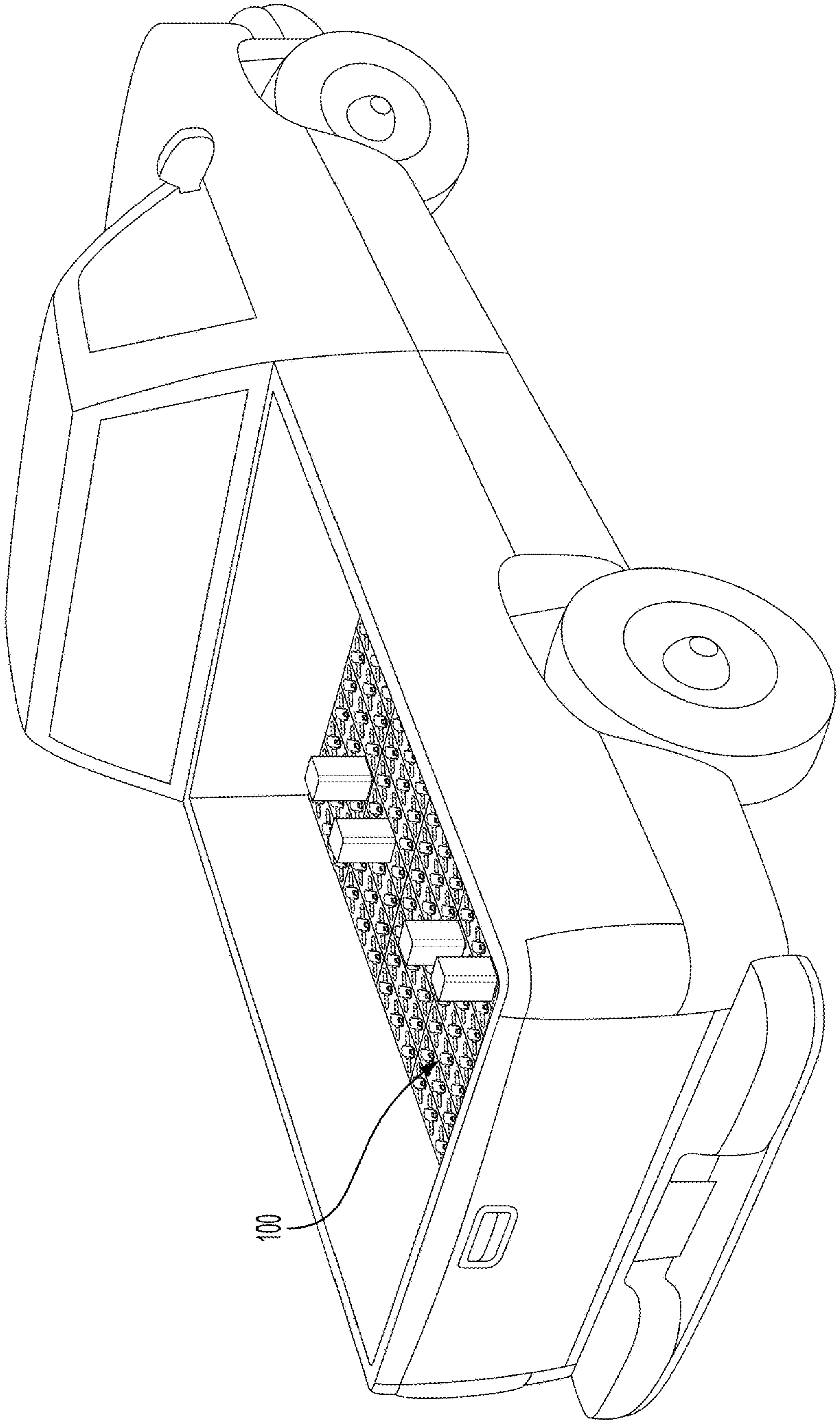
FIG. 17 is an exemplary embodiment of a cargo management system installed in a truck bed.
Figure 18:
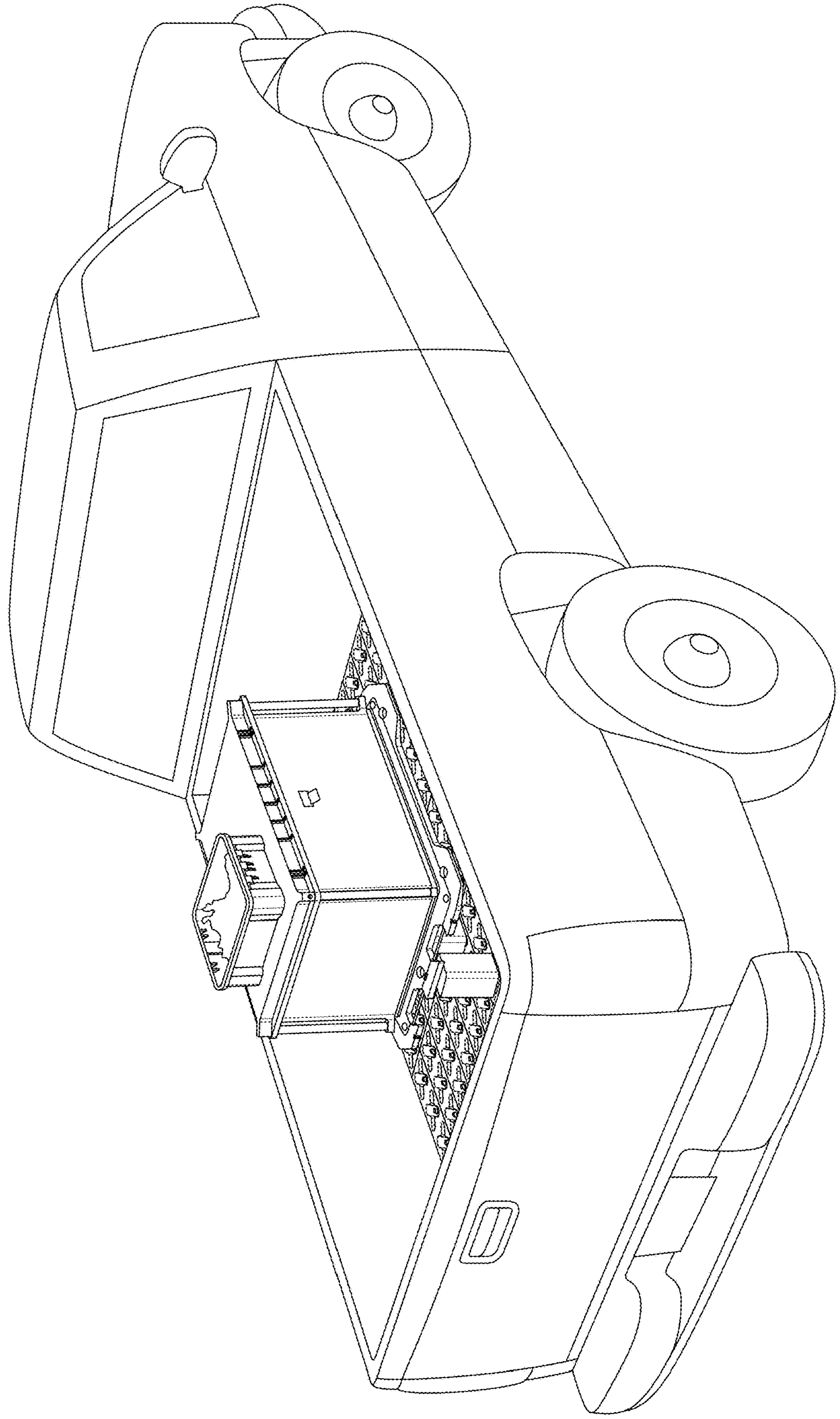
FIG. 18 is an exemplary embodiment of a cargo management system installed in a truck bed with cargo block attachments and cargo.

In yet other embodiments at least one mat side assembly tab (230), at least one mat end assembly tab (234), or both, of the first cargo mat (201), the first subsequent cargo mat (202), the second subsequent cargo mat (203), or any combination thereof, interact with at least one mat side assembly groove (232) or at least one mat end assembly groove (236) of one or more additional subsequent cargo mats to form a modular network of connected cargo mats (as shown in FIG. 16) capable of, for example, covering a large portion of a pickup truck bed (as shown in FIG. 17) or securing cargo which has a footprint larger than the surface area of one individual cargo mat (as shown in FIG. 18).

FIG. 15A illustrates an exploded cross section of an exemplary embodiment of a portion of a cargo management system (100) with a cargo mat (200), a sleeve (410), and a cargo manager foot (420). The cargo mat has at least one mat cavity (300) and at least one mat locking aperture (310). The sleeve has at least one locking fastener (404) configured to connect to the at least one mat locking aperture. The cargo manager foot has at least one cargo manager tab (421) and a cargo manager plate (423) having a plate top surface (424) and a plate bottom surface (425).

FIG. 15B illustrates an assembled cross section of an exemplary embodiment of a portion of a cargo management system (100), where the cargo manager foot (420) interacts with the sleeve (410) to form a cargo manager assembly (402), and the at least one locking fastener (404) is connected to the at least one mat locking aperture (310) such that the cargo manager assembly is securedly attached to the cargo mat (200).

FIG. 16 illustrates an exemplary embodiment of a cargo management system (100) showing multiple cargo mats ((200) as shown in FIGS. 1, 7, and 9; or comprising any or all of a first cargo mat (201), a first subsequent cargo mat (202), and a second subsequent cargo mat (203) as shown in FIG. 16) assembled into a modular network. As shown in the figure, a first cargo mat (201) may connect to a first subsequent cargo mat (202), a first cargo mat may connect to a second subsequent cargo mat (203), or both. In other embodiments, a first cargo mat may connect to a plurality of either or both first subsequent cargo mats and second subsequent cargo mats to form a modular network capable of covering a relatively large area, for example, the bed of a pickup truck (as shown in FIG. 17).

In other embodiments a first cargo mat (201) may connect sequentially to a plurality of first subsequent cargo mats (202) to form a linear network of cargo mats.

FIGS. 17 and 18 illustrate exemplary embodiments of a cargo management system (100) installed in a pickup truck bed without and with cargo manager attachments and cargo. Various combinations of cargo manager assemblies and accessories may connect to the modular network of cargo mats to secure, locate, align, or otherwise retain particular piece(s) of cargo placed thereon.

The various components of the disclosed cargo management system may be fabricated of any number of materials, and by utilizing any number of manufacturing techniques. Preferred materials include rigid plastics such as nylons, polyesters, and the like. Other materials, however, such as metals and woods, may be utilized. Preferred manufacturing techniques, particularly where one or more components are fabricated of rigid plastics, include injection molding and additive manufacturing techniques such as 3D printing. Other manufacturing techniques include stamping, cutting, bending, welding, brazing, adhesion, mechanical joinder, and the like.

The disclosed cargo management system improves upon a number of attributes of cargo management including retention, alignment, adaptability, and ease of installation and removal. The locking fastener interacts with the mat locking aperture to secure the cargo manager (or cargo manager assembly, as the case may be) to the cargo mat. Cargo retention is thereby improved, as any cargo retained by accessories fastened to an attached cargo manager assembly is held securely in place even upon sudden movement or a jarring motion, such as occurs during transport in the bed of a pickup truck. The mat side and end assembly tabs and grooves provide for the assembly of a customizable network of blocking locations, attachment points, and storage compartments. Alignment and adaptability are according enhanced, as a modular network of cargo mats can be designed to create a custom cargo management system for a variety of spaces, such as in a home or vehicle. The mat bottom surface, along with the modular nature of the system itself, allows for improved ease of assembly, installation, and removal. Cargo mats and subsequent cargo mats may be connected and put or slid into place, and repeated numbers of subsequent cargo mats can be connected in like manner, increasing ease of assembly or removal from one location, such as while standing on the ground at an open truck tailgate.

While the cargo management system has been described as having one or more exemplary embodiments or designs, the present system may be further modified within the spirit and scope of this disclosure. This application is therefore intended to cover any variations, uses, or adaptations of the cargo management system using the general principles thereof.

What is claimed is:

1. A cargo management system (100) comprising:

at least one cargo mat (200) having a mat top surface (210), a mat bottom surface (211), at least one mat sidewall (220), at least one mat cavity (300) extending from the mat top surface toward the mat bottom surface, and at least one mat locking aperture (310); and at least one cargo manager (400) having at least one locking fastener (404);

wherein the at least one mat cavity comprises at least one mat cavity sidewall (320) and a mat cavity base (370) extending between each mat cavity sidewall of the at least one mat cavity sidewall from a mat cavity sidewall juncture (372);

wherein at least one mat locking aperture of the at least one mat locking aperture is a through-opening in at least one mat cavity sidewall of the at least one mat cavity sidewall; and wherein at least one locking fastener of the at least one locking fastener is configured to interact with at least one mat locking aperture of the at least one mat locking aperture to securely attach the at least one cargo manager to the at least one cargo mat.

2. The cargo management system of claim 1, wherein at least one mat locking aperture of the at least one mat locking aperture is a through-opening originating in the mat cavity base at the mat cavity sidewall juncture and extending partially into at least one mat cavity sidewall of the at least one mat cavity sidewall.

3. The cargo management system of claim 1, wherein the at least one mat cavity comprises a mat cavity first sidewall (330) having a mat cavity first sidewall first endpoint (331) and a mat cavity first sidewall second endpoint (332), a mat cavity second sidewall (340) opposite the mat cavity first sidewall having a mat cavity second sidewall first endpoint (341) and a mat cavity second sidewall second endpoint (342), a mat cavity first endwall (350) connecting the mat cavity first sidewall first endpoint and the mat cavity second sidewall first endpoint, and a mat cavity second endwall (352) connecting the mat cavity first sidewall second endpoint and the mat cavity second sidewall second endpoint, and where the mat cavity base extends between the mat cavity first sidewall, the mat cavity second sidewall, the mat cavity first endwall, and the mat cavity second endwall from the mat cavity sidewall juncture;

wherein a first mat locking aperture (311) of the at least one mat locking aperture is a through-opening in the mat cavity first endwall and a second mat locking aperture (312) of the at least one mat locking aperture is a through-opening in the mat cavity second endwall.

4. The cargo management system of claim 3, wherein the first mat locking aperture of the at least one mat locking aperture is a through-opening originating in the mat cavity base at the mat cavity sidewall juncture and extending partially into the mat cavity first endwall and the second mat locking aperture of the at least one mat locking aperture is a through-opening originating in the mat cavity base at the mat cavity sidewall juncture and extending partially into the mat cavity second endwall.

5. The cargo management system of claim 3, wherein the at least one mat cavity further comprises where the mat cavity first sidewall further comprises a mat cavity first sidewall first interior-point (333) and a mat cavity first sidewall second interior-point (334), and where the mat cavity second sidewall further comprises a mat cavity second sidewall first interior-point (343) and a mat cavity second sidewall second interior-point (344);

a mat cavity third sidewall (360) extending from the mat cavity first sidewall first interior-point having a mat cavity third sidewall endpoint (361), a mat cavity fourth sidewall (362) extending from the mat cavity first sidewall second interior-point opposite the mat cavity third sidewall having a mat cavity fourth sidewall endpoint (363), a mat cavity third endwall (354) connecting the mat cavity third sidewall endpoint and the mat cavity fourth sidewall endpoint, a mat cavity fifth sidewall (364) extending from the mat cavity second sidewall first interior-point having a mat cavity fifth sidewall endpoint (365), a mat cavity sixth sidewall (366) extending from the mat cavity second sidewall second interior-point opposite the mat cavity fifth sidewall having a mat cavity sixth sidewall endpoint (367), a mat cavity fourth endwall (356) connecting the mat cavity fifth sidewall endpoint and the mat cavity sixth sidewall endpoint, and where the mat cavity base extends between the mat cavity first sidewall, the mat cavity second sidewall, the mat cavity first endwall, the mat cavity second endwall, the mat cavity third sidewall, the mat cavity fourth sidewall, the mat cavity third endwall, the mat cavity fifth sidewall, the mat cavity sixth sidewall, and the mat cavity fourth endwall, from the mat cavity sidewall juncture;

wherein a third mat locking aperture (313) of the at least one mat locking aperture is a through-opening in the mat cavity third endwall and a fourth mat locking aperture (314) of the at least one mat locking aperture is a through-opening in the mat cavity fourth endwall.

6. The cargo management system of claim 5, wherein the first mat locking aperture of the at least one mat locking aperture is a through-opening originating in the mat cavity base at the mat cavity sidewall juncture and extending partially into the mat cavity first endwall, the second mat locking aperture of the at least one mat locking aperture is a through-opening originating in the mat cavity base at the mat cavity sidewall juncture and extending partially into the mat cavity second endwall, the third mat locking aperture of the at least one mat locking aperture is a through-opening originating in the mat cavity base at the mat cavity sidewall juncture and extending partially into the mat cavity third endwall, and the fourth mat locking aperture of the at least one mat locking aperture is a through-opening originating in the mat cavity base at the mat cavity sidewall juncture and extending partially into the mat cavity fourth endwall.

7. The cargo management system of claim 1, wherein the at least one cargo manager further comprises a cargo manager sidewall surface (405), where the at least one locking fastener extends from the cargo manager sidewall surface.

8. The cargo management system of claim 7, further comprising an accessory (500) comprising an accessory stem (502);

wherein the at least one cargo manager further comprises a cargo manager upper edge (406), and a cargo manager top plate (407) having a cargo manager top surface (408) and a cargo manager top plate inner surface (409), wherein the cargo manager top plate extends from the cargo manager sidewall surface at the cargo manager upper edge, the cargo manager top plate extending across the at least one cargo manager, the cargo manager top plate at least connecting opposing locations of the cargo manager sidewall surface, and wherein the cargo manager top plate further comprises an accessory aperture (504);

wherein the accessory stem is configured to interact with the accessory aperture such that the accessory is removably attached to the at least one cargo manager at the cargo manager top surface.

9. The cargo management system of claim 8, further comprising at least one accessory attachment member (506);

wherein the accessory stem further comprises a threaded rod (503), where at least one of the at least one accessory attachment member is a threaded nut configured to removably attach to the threaded rod;

wherein the at least one accessory attachment member is configured to attach to the cargo manager top plate inner surface;

such that the at least one accessory attachment member aligns with the accessory aperture, such that the accessory stem may pass through the accessory aperture and interact with the at least one accessory attachment member, such that the accessory is removably attached to the at least one cargo manager.

10. The cargo management system of claim 7, further comprising at least one cargo manager connector (430), and where the at least one cargo manager comprises a plurality of cargo managers (432);

where the at least one cargo manager connector extends from at least a portion of the cargo manager sidewall surface of a first cargo manager (434) of said plurality of cargo managers, and extends between and connects to at least a portion of the cargo manager sidewall surface of an adjacent cargo manager (436) of the plurality of cargo managers;

wherein no portion of the at least one cargo manager connector extends past the mat top surface when the at least one locking fastener is attached to the at least one mat locking aperture.

11. The cargo management system of claim 10, wherein each cargo manager of the plurality of cargo managers and the at least one cargo manager connector are integrally connected as one piece.

12. The cargo management system of claim 1, comprising a cargo manager assembly (402); wherein the cargo manager assembly further comprises a sleeve (410) having a sleeve external surface (412) and a sleeve internal surface (414), and a cargo manager foot (420) having at least one cargo manager tab (421) further having a tab surface (422); where the tab surface is configured to interact with the sleeve internal surface such that the cargo manager tab is configured to interact via press fit with the sleeve; and where the at least one locking fastener extends from the sleeve external surface.

13. The cargo management system of claim 12, wherein the tab surface further comprises at least one tab protrusion (426), wherein at least one tab protrusion extends from the tab surface, such that the tab surface interacts with the sleeve internal surface via interference press fit.

14. The cargo management system of claim 1, wherein no portion of the cargo manager extends past the mat bottom surface when the at least one locking fastener is attached to the at least one mat locking aperture.

15. The cargo management system of claim 1, wherein the at least one cargo mat further comprises a mat first sidewall (221) having a mat first sidewall first endpoint (222) and a mat first sidewall second endpoint (223), a mat second sidewall (224) opposite the mat first sidewall having a mat second sidewall first endpoint (225) and a mat second sidewall second endpoint (226), a mat third sidewall (227) connecting the mat first sidewall first endpoint to the mat second sidewall first endpoint, and a mat fourth sidewall (228) opposite the mat third sidewall connecting the mat first sidewall second endpoint to the mat second sidewall second endpoint.

16. The cargo management system of claim 15, wherein the mat first sidewall comprises at least one mat side assembly tab (230), and the mat second sidewall comprises at least one mat side assembly groove (232); wherein at least one mat side assembly tab of the at least one mat side assembly tab is configured to slidably connect to at least one mat side assembly groove of the at least one mat side assembly groove of a subsequent cargo mat.

17. The cargo management system of claim 16, comprising:

a modular network of connected cargo mats;

wherein the at least one mat side assembly tab of each cargo mat of the at least one cargo mat slidably connects to the at least one mat side assembly groove of a subsequent cargo mat of the at least one cargo mat.

18. The cargo management system of claim 16, wherein the mat third sidewall comprises at least one mat end assembly tab (234), and the mat fourth sidewall comprises at least one mat end assembly groove (236); wherein at least one mat end assembly tab of the at least one mat end assembly tab is configured to slidably connect to at least one mat end assembly groove of the at least one mat end assembly groove of a subsequent cargo mat of the at least one cargo mat.

19. The cargo management system of claim 18, comprising:

a modular network of connected cargo mats;

wherein the at least one mat end assembly tab of each cargo mat of the at least one cargo mat slidably connects to the at least one mat end assembly groove of a subsequent cargo mat of the at least one cargo mat.

* * * * *